(12) United States Patent
Cheong et al.

(10) Patent No.: US 12,408,126 B2
(45) Date of Patent: Sep. 2, 2025

(54) ELECTRONIC DEVICE, METHOD, AND NON-TRANSITORY COMPUTER READABLE STORAGE MEDIUM FOR MANAGING TRANSMISSIONS TO EXTERNAL ELECTRONIC DEVICES IN WIRELESS ENVIRONMENT

(71) Applicant: Samsung Electronics Co., Ltd., Suwon-si (KR)

(72) Inventors: Gupil Cheong, Suwon-si (KR); Doosuk Kang, Suwon-si (KR); Hyungseoung Yoo, Suwon-si (KR); Juyeon Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/896,655

(22) Filed: Aug. 26, 2022

(65) Prior Publication Data

US 2023/0071138 A1    Mar. 9, 2023

Related U.S. Application Data

(63) Continuation of application No. PCT/KR2022/011707, filed on Aug. 5, 2022.

(30) Foreign Application Priority Data

Sep. 8, 2021  (KR) .......................... 10-2021-0120056
Sep. 29, 2021 (KR) .......................... 10-2021-0129314
May 26, 2022  (KR) .......................... 10-2022-0064536

(51) Int. Cl.
*H04W 56/00*    (2009.01)
*H04L 65/1069*  (2022.01)
(Continued)

(52) U.S. Cl.
CPC ....... *H04W 56/001* (2013.01); *H04L 65/1069* (2013.01); *H04L 65/613* (2022.05);
(Continued)

(58) Field of Classification Search
CPC ..... H04W 56/001; H04W 4/80; H04W 76/14; H04W 76/15; H04L 65/1069; H04L 65/613
See application file for complete search history.

(56) References Cited

U.S. PATENT DOCUMENTS 6,320,871 B1   11/2001  Mizuguchi et al.
8,331,312 B2   12/2012  Hart et al.
(Continued)

FOREIGN PATENT DOCUMENTS

CN   101771460 B   3/2013
CN   112188415 A   1/2021
(Continued)

OTHER PUBLICATIONS

European Search Report dated Sep. 25, 2024, issued in European Application No. 22867572.4.
(Continued)

*Primary Examiner* — Redentor Pasia
(74) *Attorney, Agent, or Firm* — Jefferson IP Law, LLP

(57) ABSTRACT

An electronic device is provided. The electronic device includes a communication circuitry for Bluetooth low energy (BLE), and a processor. The processor is configured to obtain a connected isochronous group (CIG) event including a first connected isochronous stream (CIS) event that includes first sub-events and a second CIS event that includes second sub-events that at least partially overlap at least part of the first sub-events, and transmit, based on receiving an acknowledgement (ACK) signal for first data transmitted to a first external electronic device via a first (Continued)

sub-event among the first sub-events, second data to a second external electronic device via a third sub-event among the second sub-events, wherein the third sub-event overlaps a second sub-event immediately after the first sub-event among the first sub-events.

20 Claims, 20 Drawing Sheets

(51) Int. Cl.
  *H04L 65/613* (2022.01)
  *H04W 4/80* (2018.01)
  *H04W 76/14* (2018.01)
  *H04W 76/15* (2018.01)
(52) U.S. Cl.
  CPC ............ *H04W 4/80* (2018.02); *H04W 76/14* (2018.02); *H04W 76/15* (2018.02)

(56) References Cited

U.S. PATENT DOCUMENTS

| | | | |
|---|---|---|---|
| 10,652,659 B2 | 5/2020 | Bhalla et al. | |
| 10,834,692 B2 | 11/2020 | Kondareddy | |
| 10,856,297 B2 | 12/2020 | Chen | |
| 10,959,128 B2* | 3/2021 | Chen | H04L 1/16 |
| 11,075,968 B1* | 7/2021 | Chen | H04L 65/80 |
| 11,240,586 B1* | 2/2022 | Yan | H04W 4/80 |
| 2007/0223441 A1 | 9/2007 | Exeler et al. | |
| 2019/0045304 A1* | 2/2019 | Bhalla | H04R 3/12 |
| 2020/0260322 A1 | 8/2020 | Chen | |
| 2020/0260448 A1* | 8/2020 | Chen | H04W 72/0453 |
| 2021/0184887 A1 | 6/2021 | Balasubramaniam et al. | |
| 2021/0376884 A1* | 12/2021 | Linsky | H04R 3/00 |
| 2022/0039041 A1* | 2/2022 | Zhu | H04L 12/40058 |
| 2022/0078541 A1* | 3/2022 | Zhu | H04W 4/38 |
| 2022/0200716 A1* | 6/2022 | Bonde | H04H 20/89 |
| 2022/0240018 A1* | 7/2022 | Hsieh | H04L 1/189 |

FOREIGN PATENT DOCUMENTS

| | | |
|---|---|---|
| CN | 112312369 A | 2/2021 |
| CN | 112740728 A | 4/2021 |
| WO | 2020124371 A1 | 6/2020 |

OTHER PUBLICATIONS

International Search Report dated Nov. 24, 2022, issued in an International Application No. PCT/KR2022/011707.
European Intention to grant dated Jul. 8, 2025, issued in European Application No. 22867572.4.

* cited by examiner

ELECTRONIC DEVICE, METHOD, AND NON-TRANSITORY COMPUTER READABLE STORAGE MEDIUM FOR MANAGING TRANSMISSIONS TO EXTERNAL ELECTRONIC DEVICES IN WIRELESS ENVIRONMENT

CROSS-REFERENCE TO RELATED APPLICATION(S)

This application is a continuation application, claiming priority under § 365(c), of an International application No. PCT/KR2022/011707, filed on Aug. 5, 2022, which is based on and claims the benefit of a Korean patent application number 10-2021-0120056, filed on Sep. 8, 2021, in the Korean Intellectual Property Office, of a Korean patent application number 10-2021-0129314, filed on Sep. 29, 2021, in the Korean Intellectual Property Office, and of a Korean patent application number 10-2022-0064536, filed on May 26, 2022, in the Korean Intellectual Property Office, the disclosure of each of which is incorporated by reference herein in its entirety.

BACKGROUND

1. Technical Field

The disclosure relates to an electronic device, a method, and a non-transitory computer readable storage media for managing transmissions to external electronic devices within wireless environments.

2. Description of Related Art

Compared to legacy Bluetooth™ (or classic Bluetooth), Bluetooth™ low energy (BLE) may provide reduced power consumption and provide at least a similar or often greater communication range between connected devices. The BLE may be provided on an industrial, scientific, and medical (ISM) radio band.

SUMMARY

In accordance with an aspect of the disclosure, an electronic device is provided. The electronic device includes a communication circuitry for Bluetooth low energy (BLE), and a processor operatively coupled with the communication circuitry, the processor being configured to obtain a connected isochronous group (CIG) event including a first connected isochronous stream (CIS) event that includes first sub-events, and a second CIS event that includes second sub-events that at least partially overlap at least part of the first sub-events, and transmit, based on receiving an acknowledgement (ACK) signal for first data transmitted to a first external electronic device via a first sub-event among the first sub-events, second data to a second external electronic device via a third sub-event among the second sub-events, wherein the third sub-event overlaps a second sub-event immediately after the first sub-event among the first sub-events.

In accordance with another aspect of the disclosure, a method for operating an electronic device with a communication circuitry for Bluetooth low energy (BLE) is provided. The method includes obtaining a connected isochronous group (CIG) event including a first connected isochronous stream (CIS) event that includes first sub-events and a second CIS event that includes second sub-events that at least partially overlap at least part of the first sub-events, and transmitting, based on receiving an acknowledgement (ACK) signal for first data transmitted to a first external electronic device via a first sub-event among the first sub-events, second data to a second external electronic device via a third sub-event among the second sub-events, wherein the third sub-event overlaps a second sub-event immediately after the first sub-event among the first sub-events.

In accordance with another aspect of the disclosure, a non-transitory computer-readable storage medium is provided. The non-transitory computer-readable storage medium includes store one or more programs comprising instructions that, when executed by at least one processor of an electronic device with a communication circuitry for a BLE, cause the electronic device to obtain a connected isochronous group (CIG) event that includes a first connected isochronous stream (CIS) event including first sub-events and a second CIS event including second sub-events at least partially overlapping at least part of the first sub-events, based on receiving an acknowledgement (ACK) signal on first data transmitted to a first external electronic device via a first sub-event among the first sub-events, transmit second data to a second external electronic device via a third sub-event among the second sub-events overlapping a second sub-event immediately after the first sub-event among the first sub-events.

In accordance with another aspect of the disclosure, an electronic device is provided. The electronic device includes communication circuitry for Bluetooth low energy (BLE), and a processor operatively coupled with the communication circuitry. The processor is configured to transmit, to a first external electronic device, a first packet that is a last packet from at least one target packet allocated for transmitting to the first external electronic device within a first connected isochronous stream (CIS) event in a connected isochronous group (CIG) event, via a second sub-event before a first sub-event ending the first CIS event, transmit, in response to receiving an acknowledgement (ACK) signal for the first packet via the second sub-event from the first external electronic device, a second packet to a second external electronic device via a sub-event among sub-events in a second CIS event in the CIG event, and re-transmit, in response to receiving a non-acknowledgement (NACK) signal for the first packet via the second sub-event from the first external electronic device, the first packet to the first external electronic device via a sub-event immediately after the second sub-event among remaining sub-events in the first CIS event.

In accordance with another aspect of the disclosure, a method for operating an electronic device with a communication circuitry for Bluetooth low energy (BLE) is provided. The method includes transmitting, to a first external electronic device, a first packet that is a last packet from at least one target packet allocated for transmitting to the first external electronic device within a first connected isochronous stream (CIS) event in a connected isochronous group (CIG) event, via a second sub-event before a first sub-event ending the first CIS event, transmitting, in response to receiving an acknowledgement (ACK) signal for the first packet via the second sub-event from the first external electronic device, a second packet to a second external electronic device via a sub-event among sub-events in a second CIS event in the CIG event, and re-transmitting, in response to receiving a non-acknowledgement (NACK) signal for the first packet via the second sub-event from the first external electronic device, the first packet to the first external electronic device via a sub-event immediately after the second sub-event among remaining sub-events in the first CIS event.

In accordance with another aspect of the disclosure, a non-transitory computer-readable storage medium is provided. The non-transitory computer-readable storage medium stores one or more programs comprising instructions that, when executed by at least one processor of an electronic device with a communication circuitry for a BLE, cause the electronic device to transmit, to a first external electronic device, a first packet that is a last packet from at least one target packet allocated for transmitting to the first external electronic device within a first connected isochronous stream (CIS) event in a connected isochronous group (CIG) event, via a second sub-event before a first sub-event ending the first CIS event, transmit, in response to receiving an acknowledgement (ACK) signal for the first packet via the second sub-event from the first external electronic device, a second packet to a second external electronic device via a sub-event among sub-events in a second CIS event in the CIG event, and re-transmit, in response to receiving a non-acknowledgement (NACK) signal for the first packet via the second sub-event from the first external electronic device, the first packet to the first external electronic device via a sub-event immediately after the second sub-event among remaining sub-events in the first CIS event.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
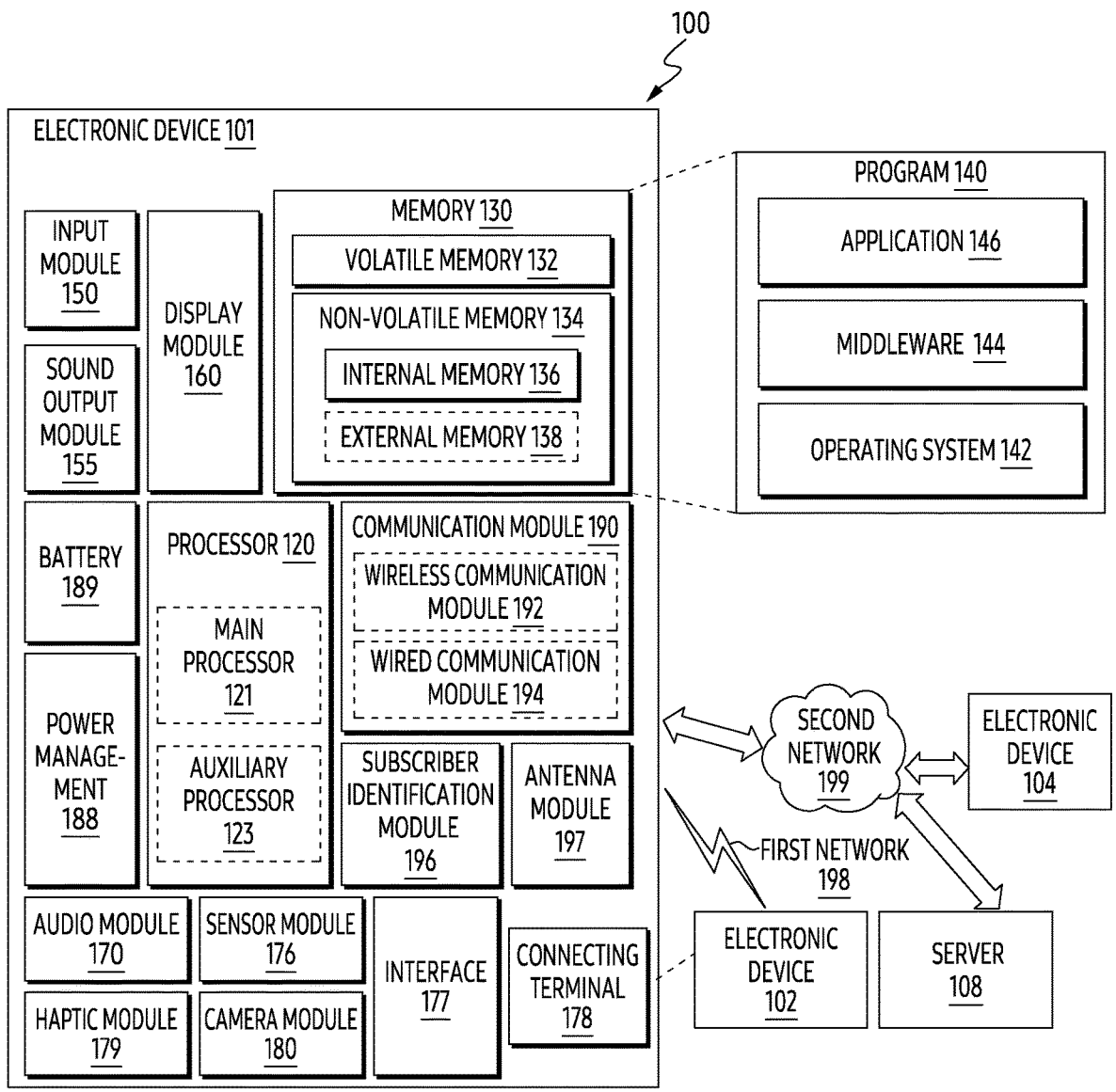
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device, using an isochronous logical transport referred to as a connected isochronous stream (CIS), may transmit data (or packets) including information on multimedia contents to each of the external electronic devices through an isochronous link between each of the plurality of external electronic devices and the electronic device. For example, the CIS may be configured as a connected isochronous group (CIG) event including a plurality of CIS events.

Meanwhile, the quality of a link (e.g., CIS link) between each of the plurality of external electronic devices and the electronic device may change depending on a change in a wireless environment including the electronic device. For example, when the electronic device communicates with each of the plurality of external electronic devices through the CIG event including the plurality of CIS events by sequential arrangement or interleaved arrangement, the quality of communication with each of the plurality of external electronic devices may be reduced according to a change in the quality of the link according to a change in a wireless environment.

Figure 2:
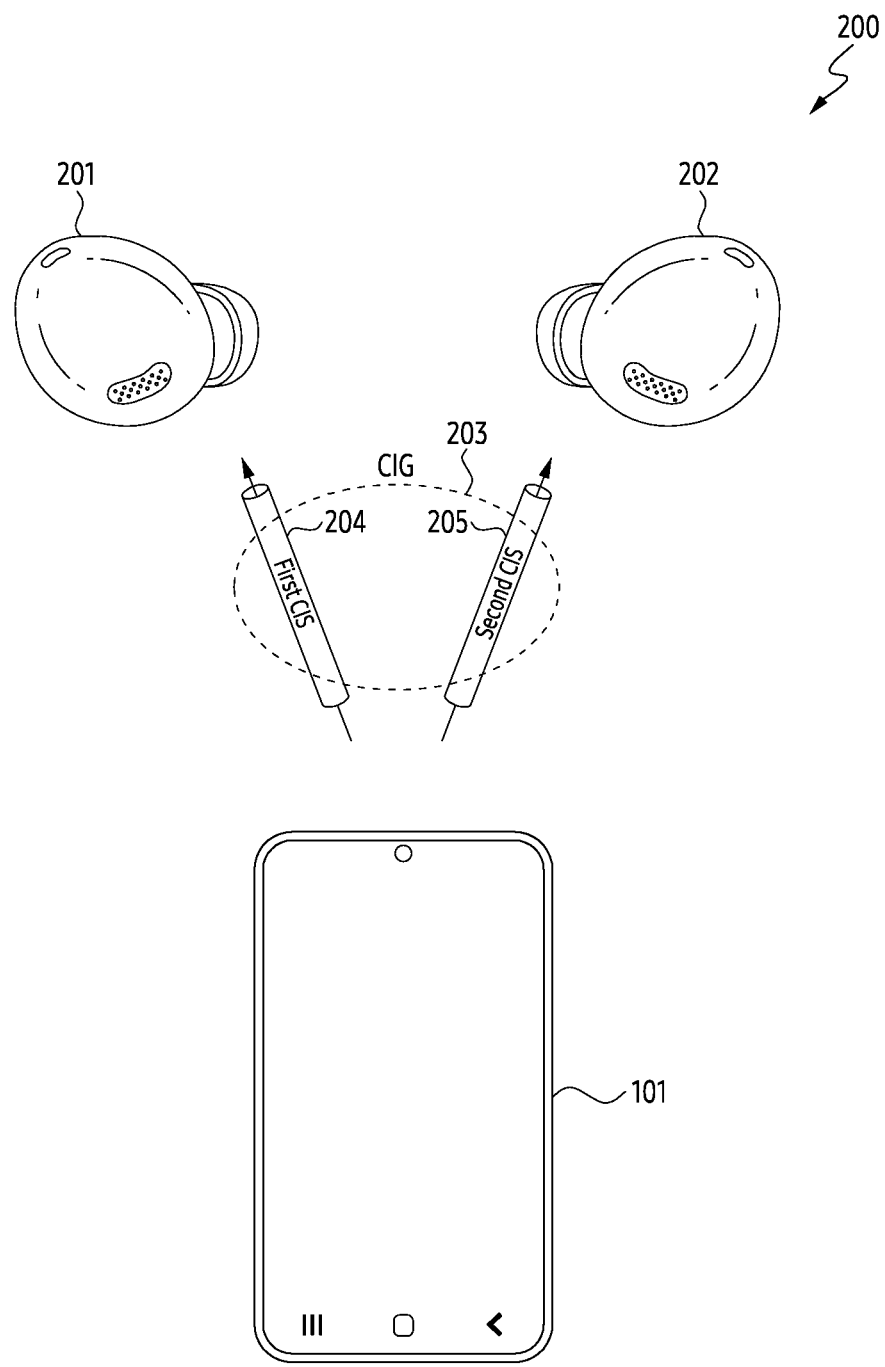
FIG. 2 illustrates an example of a wireless environment including an electronic device according to an embodiment of the disclosure.

FIG. 2 illustrates an example of a wireless environment including an electronic device according to an embodiment of the disclosure.

Referring to FIG. 2, the wireless environment 200 may include an electronic device 101, a first external electronic device 201, and a second external electronic device 202.

The electronic device 101 in the wireless environment 200 may be an audio source device such as e.g., a smartphone, a laptop computer, or a tablet personal computer (PC). The electronic device 101 may transmit data on audio played in the electronic device 101 to each of the first external electronic device 201 and the second external electronic device 202. For example, the data may be usable within each of the first external electronic device 201 and the second external electronic device 202 to output audio from each of the first external electronic device 201 and the second external electronic device 202. The electronic device 101 may be referred to as a master device.

The first external electronic device 201 and the second external electronic device 202 in the wireless environment 200 may be audio sink devices such as e.g., earbuds or earphones. For example, the first external electronic device 201 and the second external electronic device 202 may be configured as a pair, but it is not limited to thereto. Each of the first external electronic device 201 and the second external electronic device 202 may receive the data from the electronic device 101 and based on the data, output audio through a speaker of each of the first external electronic device 201 and the second external electronic device 202. Each of the first external electronic device 201 and the second external electronic device 202 may be referred to as a slave device.

The electronic device 101, the first external electronic device 201, and the second external electronic device 202 may support multi-stream audio. For example, synchronized and independent multiple audio streams may be transmitted between the electronic device 101 and the first external electronic device 201 and/or between the electronic device 101 and the second external electronic device 202. For example, in order to support the multi-stream audio, a connected isochronous group (CIG) 203 including connected isochronous streams (CIS) may be used.

The CIG 203 may consist of two or more CISs with the same ISO (isochronous) interval. For example, the CIG 203 may include a first CIS 204 and a second CIS 205. Each of the first CIS 204 and the second CIS 205 may be a logical transport to cause the electronic device 101, the first external electronic device 201, and the second external electronic device 202 to transfer isochronous data unidirectionally or bidirectionally. Each of the first CIS 204 and the second CIS 205 may be associated with an asynchronous connection (ACL). Each of the first CIS 204 and the second CIS 205 may support packets of variable size and support transmitting one or more packets within an isochronous event.

The first CIS 204 may be used to transmit at least one packet from the electronic device 101 to the first external electronic device 201. For example, the at least one packet may be used to output audio played in the electronic device 101 through a speaker of the first external electronic device 201. The first CIS 204 may be used to transmit an acknowledgement signal for the at least one packet or a non-acknowledgement signal for the at least one packet, from the first external electronic device 201 to the electronic device 101. For example, the acknowledgement signal may be transmitted from the first external electronic device 201 to the electronic device 101 through the first CIS 204 to indicate that the first external electronic device 201 successfully receives the at least one packet, and the non-acknowledgement signal may be transmitted from the first external electronic device 201 to the electronic device 101 through the first CIS 204 to indicate that the first external electronic device 201 fails to receive the at least one packet.

The second CIS 205 may be used to transmit at least one packet from the electronic device 101 to the second external electronic device 202. For example, the at least one packet may be used to output audio played in the electronic device 101 through a speaker of the second external electronic device 202. The audio output through the speaker of the first external electronic device 201 and the audio output through the speaker of the second external electronic device 202 may provide stereophonic sound, but it is not limited thereto. The second CIS 205 may be used to transmit an acknowledgement signal for the at least one packet or a non-acknowledgement signal for the at least one packet from the second external electronic device 202 to the electronic device 101.

Figure 3:
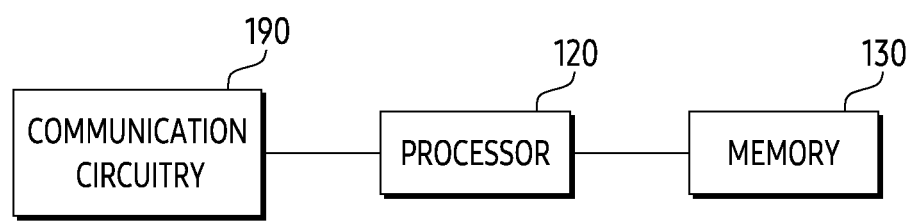
FIG. 3 is a simplified block diagram of an electronic device according to an embodiment of the disclosure.

FIG. 3 is a simplified block diagram of an electronic device according to an embodiment of the disclosure. Components indicated by the block diagram may be included in the electronic device 101 illustrated in FIG. 1 or the electronic device 101 illustrated in FIG. 2.

Figure 4A:
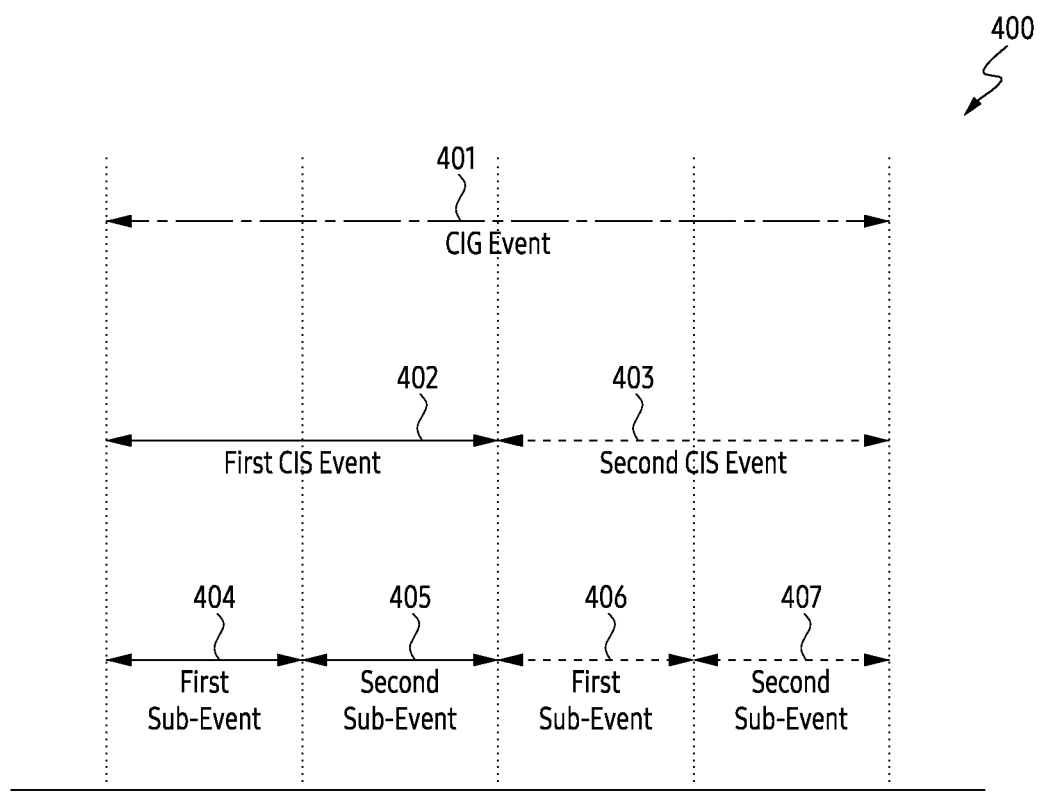
FIG. 4A is a timing diagram illustrating a connected isochronous group (CIG) event having sequential arrangements.

FIG. 4A is a timing diagram illustrating a connected isochronous group (CIG) event having sequential arrangement according to an embodiment of the disclosure.

Figure 4B:
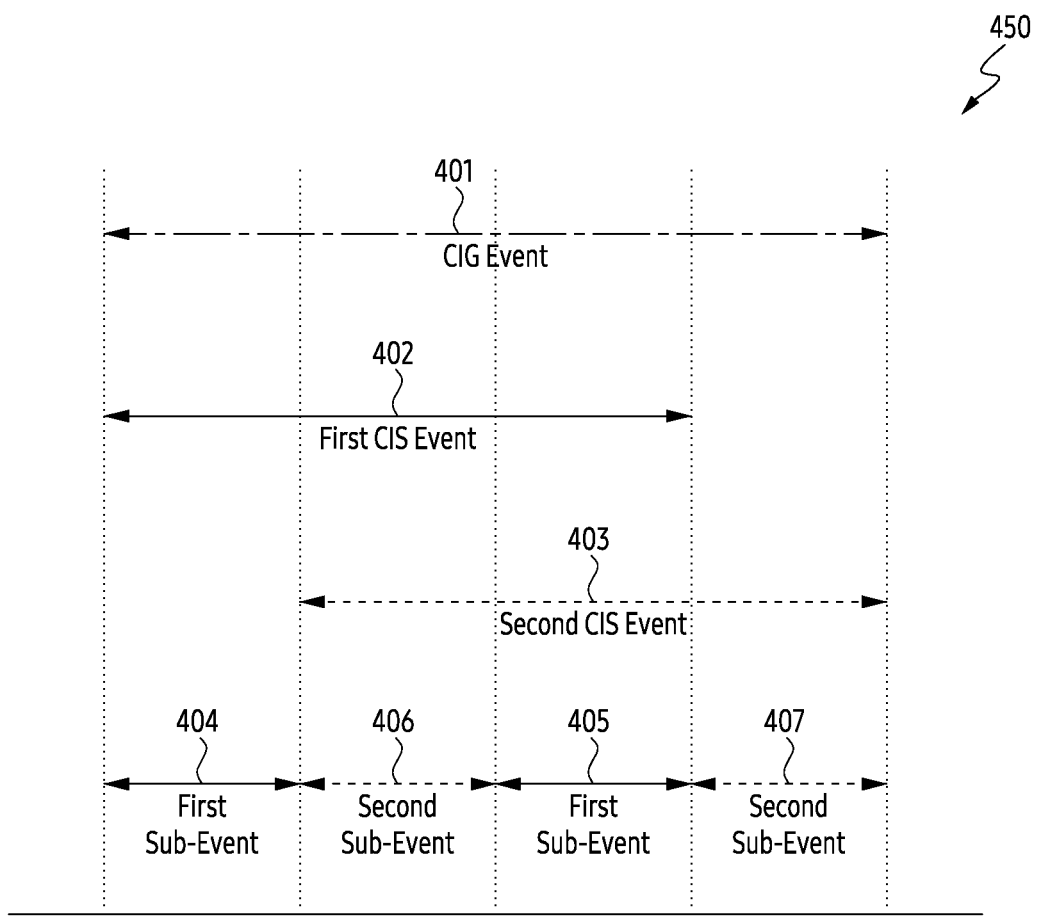
FIG. 4B is a timing diagram illustrating a CIG event having an interleaved arrangement.

FIG. 4B is a timing diagram illustrating a CIG event having an interleaved arrangement according to an embodiment of the disclosure.

Figure 5A:
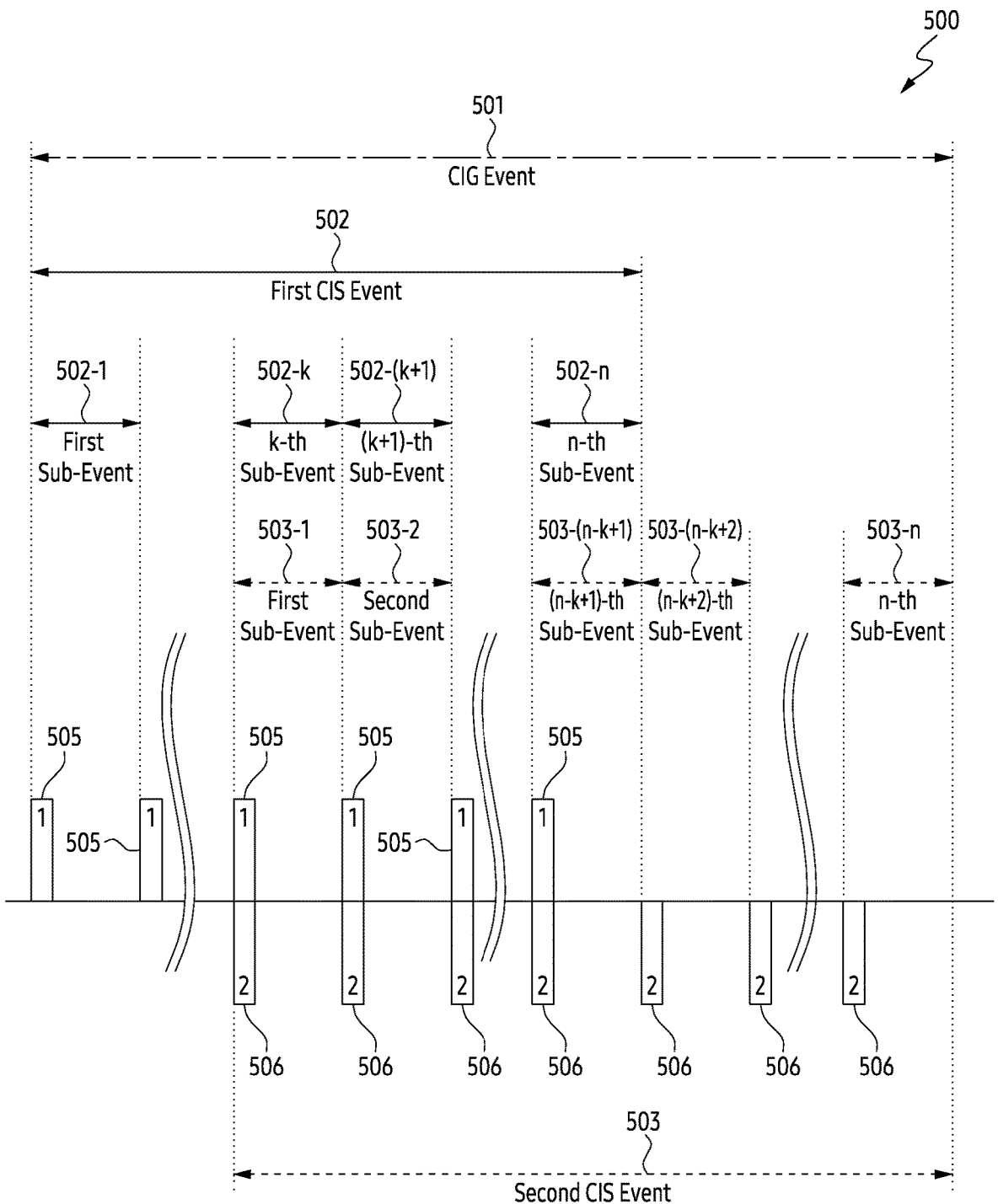
FIGS. 5A, 5B, and 5C are timing diagrams illustrating a CIG event having a hybrid arrangement according to various embodiments of the disclosure.
Figure 5B:
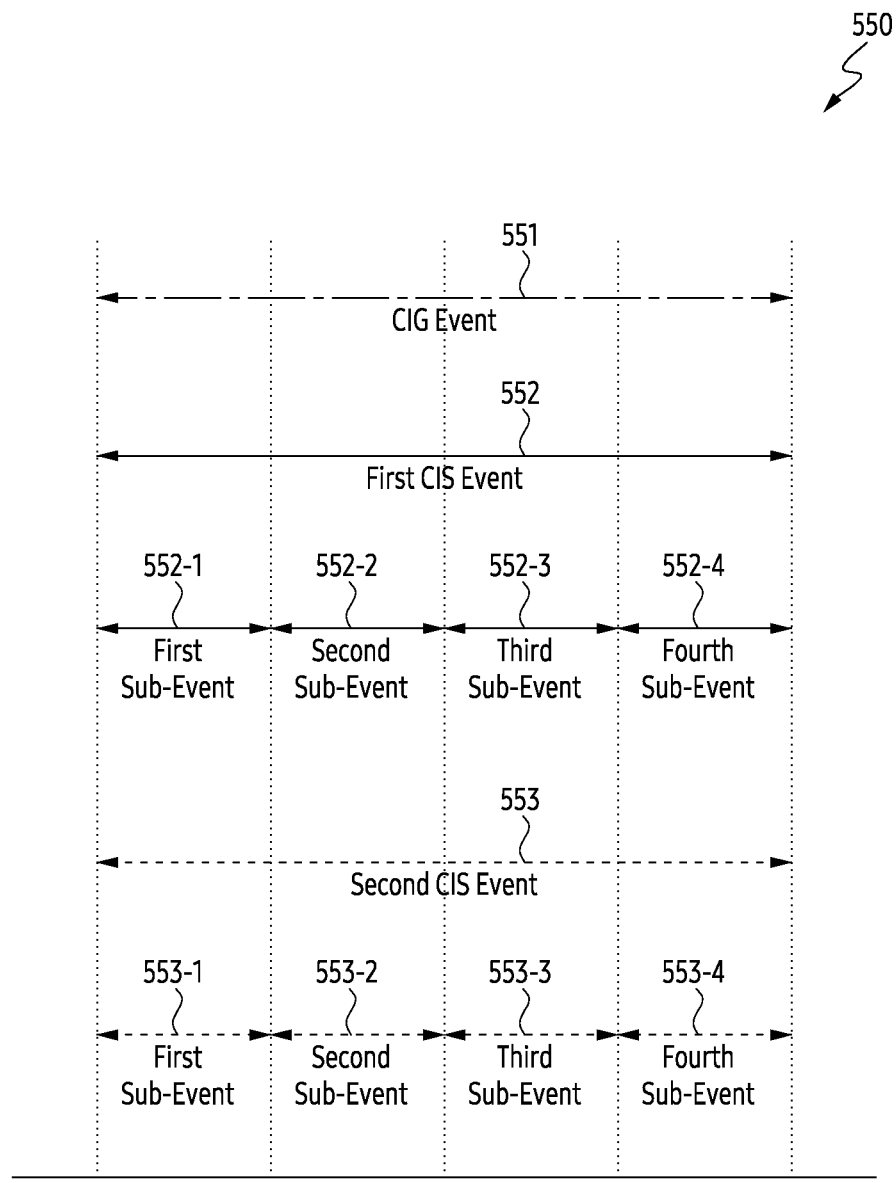
Figure 5C:
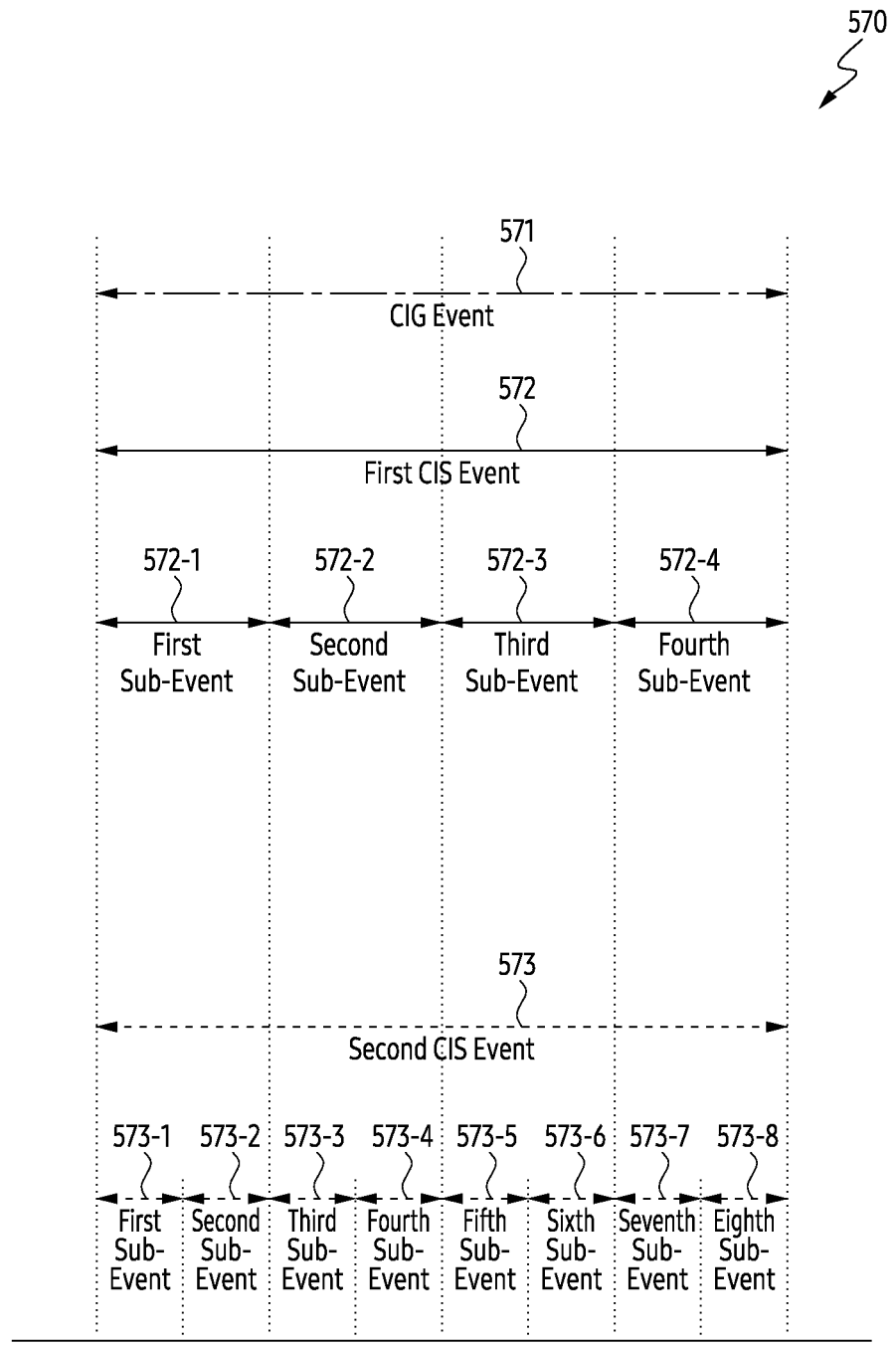

FIGS. 5A, 5B, and 5C are timing diagrams illustrating a CIG event having a hybrid arrangement according to various embodiments of the disclosure.

Figure 6:
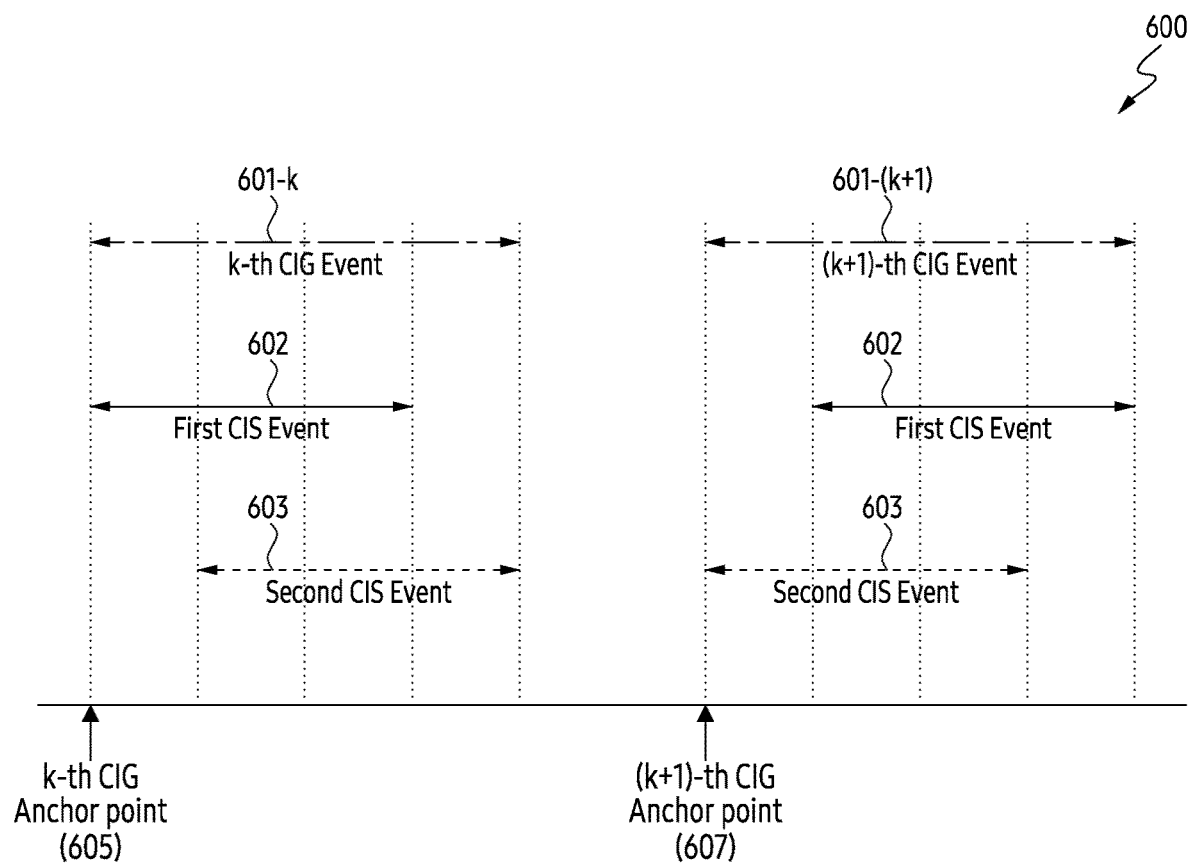
FIG. 6 is a timing diagram illustrating an anchor point of a CIG event having a hybrid arrangement according to an embodiment of the disclosure.

FIG. 6 is a timing diagram illustrating an anchor point of a CIG event having a hybrid arrangement according to an embodiment of the disclosure.

Figure 7A:
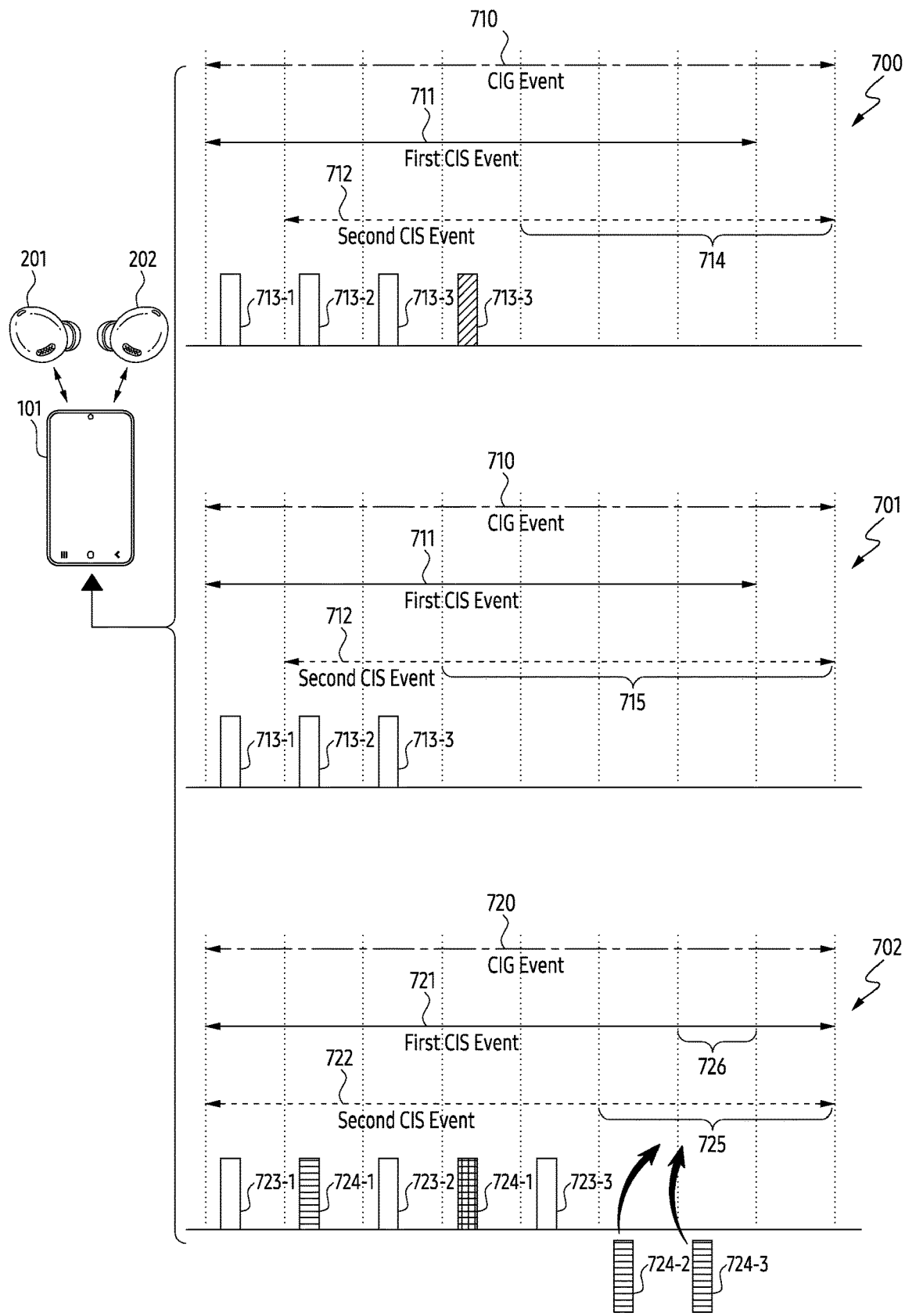
FIG. 7A illustrates methods of transmitting data through a CIG event having a hybrid arrangement according to an embodiment of the disclosure.

FIG. 7A illustrates methods of transmitting data through a CIG event having a hybrid arrangement according to an embodiment of the disclosure.

Figure 7B:
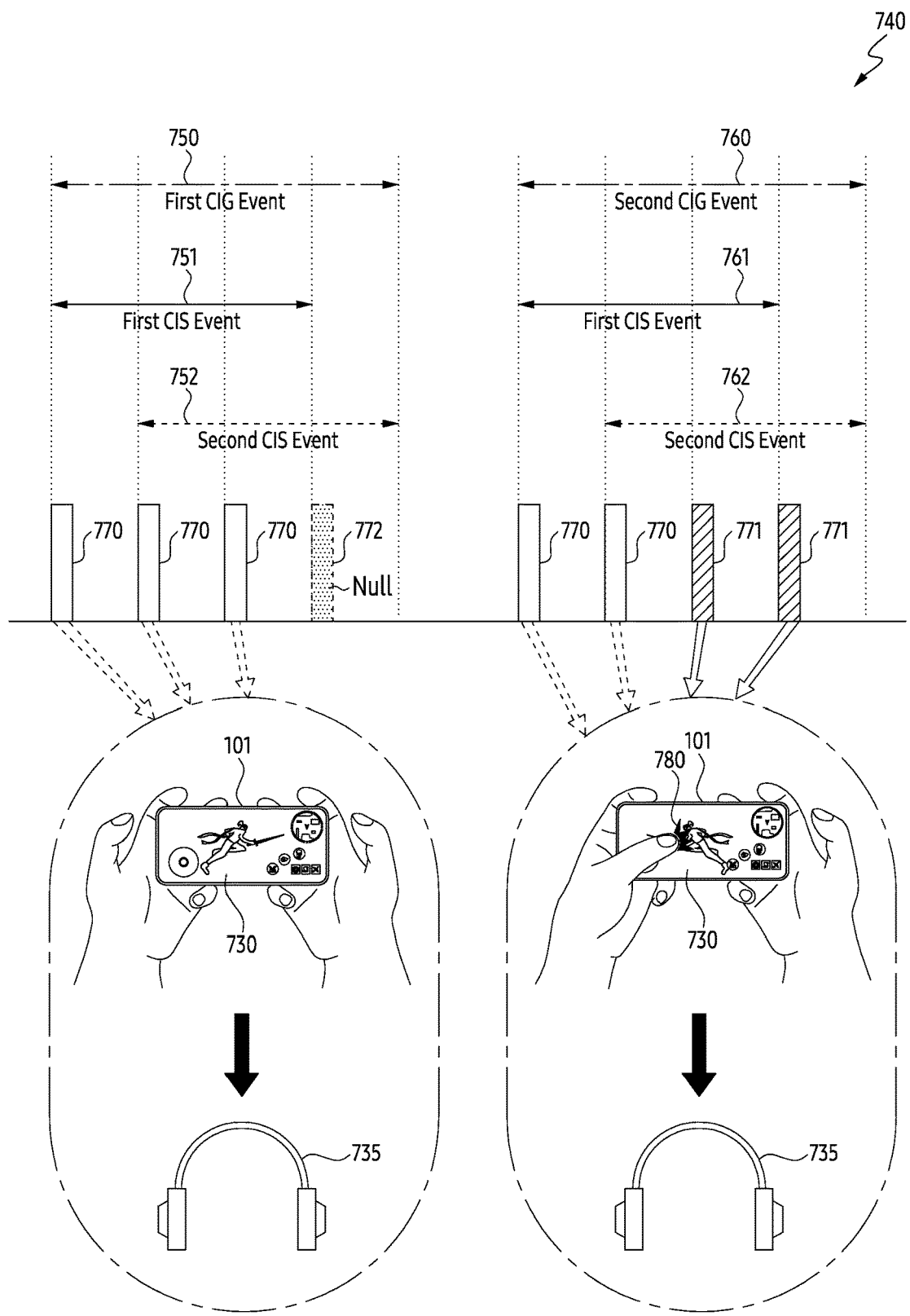
FIG. 7B illustrates an example of transmitting data through a CIG event based on identification of a designated event according to an embodiment of the disclosure.

FIG. 7B illustrates an example of transmitting data through a CIG event based on identification of a designated event according to an embodiment of the disclosure.

Referring to FIG. 3, the electronic device 101 may comprise a processor 120, a memory 130, and a communication circuitry 190.

The processor 120 may comprise the processor 120 in FIG. 1. The memory 130 may comprise the memory 130 of FIG. 1. The communication circuitry 190 may include the communication module 190 of FIG. 1 used to communicate with an external electronic device (e.g., the first external electronic device 201 or the second external electronic device 202 shown in FIG. 2) through the first network 198.

The processor 120 in the electronic device 101 may obtain, configure, or set a CIG event (e.g., the event of the CIG 203 shown in FIG. 2) including a first CIS event (e.g., an event of the first CIS 204 shown in FIG. 2) for the first external electronic device 201 and a second CIS event (e.g., an event of the second CIS 205 shown in FIG. 2) for the second external electronic device 202, in order to transmit data or at least one packet to each of the first external electronic device 201 and the second external electronic device 202. For example, the CIG event including the first CIS event and the second CIS event may start at a start timing of an initial sub-event of an initially scheduled CIS and may end at an end timing of the last sub-event within an ISO interval. For example, the anchor point of the CIG event may occur simultaneously with the anchor point of the first CIS event in the CIG event.

Each of the first CIS event and the second CIS event may consist of one or more sub-events. For example, the sub-event in the first CIS event may be used to transmit packets from the electronic device 101 and transmit a response packet from the first external electronic device 201 (e.g., the acknowledgement signal defined through the description of FIG. 2 or the non-acknowledgement signal defined through the description of FIG. 2). A sub-event in the second CIS event may be used for transmitting a packet from the electronic device 101 and transmitting a response packet from the second external electronic device 202.

Each of the first CIS event and the second CIS event may be scheduled in a sequential arrangement or an interleaved arrangement within the CIG event. For example, referring to FIG. 4A, as shown in the timing diagram 400, the processor 120 may schedule a first CIS event 402 including a first sub-event 404 and a second sub-event 405, and a second CIS event 403 including a first sub-event 406 and a second sub-event 407 in a CIG event 401 in the sequential arrangement. As shown in timing diagram 400, the processor 120 may acquire, configure, or set the CIG event 401 including the first CIS event 402 and the second CIS event 403 in the sequential arrangement by scheduling the second CIS event 403 immediately after the first CIS event 402. Since the first CIS event 402 and the second CIS event 403 are scheduled back-to-back in the sequential arrangement, the first CIS event 402 and the second CIS event 403 do not overlap each other in the sequential arrangement.

In another example, referring to FIG. 4B, as shown in timing diagram 450, the processor 120 may schedule a first CIS event 402 including a first sub-event 404 and a second sub-event 405, and a second CIS event 403 including a first sub-event 406 and a second sub-event 407 in a CIG event 401 in the interleaved arrangement. As shown in the timing diagram 450, the processor 120 may obtain, configure, or set the CIG event 401 including the first CIS event 402 and the second CIS event 403 in the interleaved arrangement, by scheduling the first sub-event 406 in the second CIS event 403 immediately after the first sub-event 404 in the first CIS event 402, scheduling the second sub-event 405 in the first CIS event 402 immediately after the first sub-event 406 in the second CIS event 403, and scheduling the second sub-event 407 in the second CIS event 403 immediately after the second sub-event 405 in the first CIS event 402. For example, within the timing diagram 450, since the first CIS event 402 starts at the start timing of the first sub-event 404 and ends at the end timing of the second sub-event 405, while not including the first sub-event 406, and the second CIS event 403 starts at the start timing of the first sub-event 406 and ends at the end timing of the second sub-event 407, while not including sub-event 405, the first CIS event 402 and the second CIS event 403 do not overlap each other in the interleaved arrangement. In each of the sequential arrangement and the interleaved arrangement, since the processor 120 may transmit a packet once through each of the first sub-event 404, the second sub-event 405, the first sub-event 406, and the second sub-event 407, the processor 120 may transmit a packet to the first external electronic device 201 at most twice through the first CIS event 402 and transmit a packet to the second external electronic device 202 at most twice through the second CIS event 403, in each of the sequential arrangement and the interleaved arrangement. In other words, in each of the sequential arrangement and the interleaved arrangement, the opportunity to transmit a packet through the first CIS event 402 is fixed and the opportunity to transmit a packet through the second CIS event 403 is fixed. For example, in each of the sequential arrangement and the interleaved arrangement, the processor 120 may not adaptively change the number of times of transmitting a packet through the first CIS event 402 and the number of times of transmitting a packet through the second CIS event 403, according to the quality of the first link between the first external electronic device 201 and the electronic device 101, and the quality of the second link between the second external electronic device 202 and the electronic device 101.

Referring back to FIG. 3, the processor 120 may obtain, configure, or set the CIG event in order to adaptively change the number of times of transmitting a packet through the first CIS event and the number of times of transmitting a packet through the second CIS event, by scheduling the second CIS event at least partially overlapping at least part of the first CIS event. For example, by scheduling the anchor point of the second CIS event within the first CIS event, the processor 120 may obtain the CIG event including the first CIS event and the second CIS event at least partially overlapping at least part of the first CIS event. The processor 120 may obtain the CIG event including the first CIS event and the second CIS event including the sub-event at least partially overlapping at least part of the sub-events in the first CIS event. Overlapping at least a part of the first CIS event and at least a part of the second CIS event may be referred to as a hybrid arrangement in terms of having both the characteristics of the sequential arrangement and the characteristics of the interleaved arrangement.

The processor 120 may schedule the first CIS event and the second CIS event in the CIG event in the hybrid arrangement, based on satisfying a specified condition.

For example, the processor 120 may schedule the first CIS event and the second CIS event in the CIG event in the hybrid arrangement, based on identifying that at least one external electronic device (e.g., the first external electronic device 201 and the second external electronic device 202) supports the hybrid arrangement. The processor 120 may schedule the first CIS event and the second CIS event in the CIG event in the hybrid arrangement, based on identifying data indicating the support for the hybrid arrangement from capability information of the at least one external electronic device received from the at least one external electronic device. The processor 120 may schedule the first CIS event and the second CIS event in the CIG event in the hybrid arrangement, based on identifying that a modulation scheme of a signal received from the at least one external electronic device indicates supporting the hybrid arrangement.

For example, under the condition that an anchor point of at least some of the sub-events in the first CIS event corresponds to an anchor point of at least some of the sub-events in the second CIS events, the processor 120 may obtain the CIG event including the second CIS event including the sub-events at least partially overlapping at least a part of the sub-events in the first CIS event. Under the condition that a time interval between an anchor point of a first sub-event among the sub-events in the first CIS event and an anchor point of a second sub-event immediately after the first sub-event among the sub-events in the first CIS event is a multiple of a time interval between an anchor point of a third sub-event among the sub-events in the second CIS event and an anchor point of a fourth sub-event immediately after the third sub-event of the sub-events in the second CIS event, the processor 120 may obtain the CIG event including the second CIS event including the sub-events at least partially overlapping at least a part of the sub-events in the first CIS event. Under the condition that a time interval between an anchor point of the third sub-event among the sub-events in the second CIS event and an anchor point of the fourth sub-event among the sub-events in the second CIS event is a multiple of a time interval between an anchor point of the first sub-event among the sub-events in the first CIS event and an anchor point of the second sub-event among the sub-events in the first CIS event, the processor 120 may obtain the CIG event including the second CIS event including the sub-events at least partially overlapping at least a part of the sub-events in the first CIS event. Under the condition that a length of each of the sub-events in the first CIS event is a multiple of a length of each of the sub-events in the second CIS events or the length of each of the sub-events in the second CIS event is a multiple of the length of each of the sub-events in the first CIS events, the processor 120 may obtain the CIG event including the second CIS event including the sub-events at least partially overlapping at least the part of the sub-events in the first CIS event. For example, under the condition that the length of each of the sub-events in the first CIS event is identical to the length of each of the sub-events in the second CIS events, the processor 120 may obtain the CIG event including the first CIS event and the second CIS event including sub-events at least partially overlapping at least a part of the sub-events in the first CIS event.

Referring to FIG. 5A, as shown in the timing diagram 500, the processor 120 may set or obtain a CIG event 501 including a first CIS event 502 and a second CIS event 503 partially overlapping part of the first CIS event 502. For example, the processor 120 may set or obtain the CIG event 501 by scheduling the first CIS event 502 and the second CIS event 503 so that each of the kth sub-event 502-$k$ (k is a natural number greater than 1 and less than n) to n-th sub-event 502-$n$ in the first CIS event 502 overlaps each of the first sub-event 503-1 to (n−k+1)th sub-event 503-($n$−k+1) in the second CIS event 503. Since the first CIS event 502 includes kth sub-events 502-$k$ to n-th sub-events 502-$n$ each overlapping the first sub-events 503-1 to (n−k+1)th sub-event 503-($n$−k+1) and the first sub-events 502-1 to (k−1)th sub-event 502-(k−1) that do not overlap the second CIS event 503, the number of times of transmitting a packet through the first CIS event 502 may be (k−1) to n times. Within the timing diagram 500, since the second CIS event 503 includes first sub-event 503-1 to (n−k+1)th sub-event 503-(n−k+1) each overlapping kth sub-event 502-$k$ to nth sub-event 502-$n$ and (n−k+2)th sub-event 503-(n−k+2) to nth sub-event 503-$n$ that do not overlap the first CIS event 502, the number of times of transmitting a packet through the second CIS event 503 may be k−1 times to n times. For example, the processor 120 may transmit a packet 505 for the first external electronic device 201 through at least a part of a time interval (e.g., first sub-event 502-1 to (k−1)th sub-event 502-(k−1)) of the first CIS event 502 that does not overlap the second CIS event 503; and transmit one of a packet 505 for the first external electronic device 201 and a packet 506 for the second external electronic device 202 through at least a portion of the time interval (e.g., k-th sub-event 502-$k$ to n-th sub-event 502-$n$) of the first CIS event 502 overlapping the second CIS event 503 (or a time interval (e.g., first sub-event 503-1 to (n−k+1)th sub-event 503-(n−k+1) of the second CIS event 503 overlapping the first CIS event 502)); and transmit a packet 506 for the second external electronic device 202 through at least a portion of the time interval (e.g., (n−k+2)th sub-event 503-($n$−k+2) to n-th sub-event 503-$n$) of the second CIS event 503 that does not overlap the first CIS event 502. For example, based on transmitting the last target packet transmitted to the first external electronic device 201 through the first CIS event 502 to the first external electronic device 201 through the kth sub-event 502-$k$ and receiving the acknowledgement signal for the last target packet from the first external electronic device 201 through the kth sub-event 502-k, the processor 120 may transmit the packet 506 to the second external electronic device 202 through each of the second sub-event 503-2 to (n−k+1)th sub-event 503-(n−k+1) and cease transmitting the packet 505 to the first external electronic device 201 through the sub-event 502-(k+1) to the sub-event 502-n. In this situation, the last target packet may refer to a packet that is last transmitted among scheduled target packets, which is transmitted to the first external electronic device 201 in the first CIS event 502 based on a burst number (BN) and a flush timeout (FT) of the first CIS event 502.

The processor 120 may adaptively change the number of times a packet is transmitted to the first external electronic device 201 through the CIG event 501 and the number of times a packet is transmitted to the second external electronic device 202 through the CIG event 501, by obtaining the CIG event 501 including the first CIS event 502 and the second CIS event 503 partially overlapping a part of the first CIS event 502. For example, when the quality of the first link between the first external electronic device 201 and the electronic device 101 is much better than the quality of the second link between the second external electronic device 202 and the electronic device 101, the processor 120 may enhance the quality of multi-stream audio by allocating a time interval of the second CIS event 503 partially overlapped with a part of the first CIS event 502 with a time interval for transmitting packets to the second external electronic device 202.

FIG. 5A illustrates an example that the length of each of the first sub-event 502-1 to n-th sub-event 502-n in the first CIS event 502 is the same as the length of the first sub-event 503-1 to n-th sub-events 503-n in the second CIS event 503, but this is only for convenience of description. For example, although not shown in FIG. 5A, even when the length of each of the first sub-event 502-1 to n-th sub-events 502-n in the first CIS event 502 is different from the length of the first sub-events 503-1 to n-th sub-events 503-n in the second CIS event 503, the processor 120 may obtain the CIG event 501 including the first CIS event 502 and the second CIS event 503 at least partially overlapping at least a part of the first CIS event 502, under the condition that each of the anchor points of at least a part of the first sub-event 502-1 to n-th sub-event 502-n in the first CIS event 502 (e.g., k-th sub-event 502-k to n-th sub-event 502-n) corresponds to each of the anchor points of at least a part of the first sub-event 503-1 to n-th sub-event 503-n in the second CIS event 503 (e.g., the first sub-event 503-1 to (n−k+1)th sub-event 503-(n−k+1)).

Although not shown in FIG. 5A, under the condition that an interval between the anchor points of the first sub-event 502-1 to n-th sub-event 502-n in the first CIS event 502 is a multiple of an interval between the anchor points of the first sub-event 503-1 to n-th sub-event 503-n in the second CIS event 503, and an offset of the anchor point of each of the first sub-event 502-1 to n-th sub-event 502-n in the first CIS event 502 corresponds to an offset of the anchor point of each of the first sub-event 503-1 to n-th sub-event 503-n in the second CIS event 503, the processor 120 may obtain the CIG event 501 including the first CIS event 502 and the second CIS event 503 at least partially overlapping at least a part of the first CIS event 502.

Although not shown in FIG. 5A, under the condition that an interval between the anchor points of the first sub-event 503-1 to n-th sub-event 503-n in the second CIS event 502 is a multiple of an interval between the anchor points of the first sub-event 502-1 to n-th sub-event 502-n in the first CIS event 502, and an offset of the anchor point of each of the first sub-event 502-1 to n-th sub-event 502-n in the first CIS event 502 corresponds to an offset of the anchor point of each of the first sub-event 503-1 to n-th sub-event 503-n in the second CIS event 503, the processor 120 may obtain the CIG event 501 including the first CIS event 502 and the second CIS event 503 at least partially overlapping at least a part of the first CIS event 502.

In another example, referring to FIG. 5B, as shown in the timing diagram 550, the processor 120 may obtain a CIG event 551 including a first CIS event 552 and a second CIS event 553 completely overlapping the first CIS event 552. For example, the processor 120 may obtain the CIG event 551 by scheduling the first CIS event 552 and the second CIS event 553 such that each of the first sub-event 552-1 to the fourth sub-event 552-4 in the first CIS event 552 overlaps each of the first sub-event 553-1 to the fourth sub-event 553-4 in the second CIS event 553. Since the first CIS event 552 and the second CIS event 553 completely overlap each other within the CIG event 551, the processor 120 may adaptively change the number of times a packet may be transmitted through the first CIS event 552 and the number of times a packet may be transmitted through the second CIS event 553. For example, based on transmitting the last target packet transmitted to the first external electronic device 201 through the first CIS event 552 to the first external electronic device 201 through the first sub-event 552-1 and receiving an acknowledgement signal for the last target packet from the first external electronic device 201 through the first sub-event 552-1, the processor 120 may stop transmitting packets to the first external electronic device 201 through the second sub-event 552-2 to the fourth sub-event 552-4, which are remaining sub-events of the first CIS event 552, and transmit the packets to the second external electronic device 202 through at least a part of the second sub-event 553-2 to the fourth sub-event 553-4. The processor 120 may enhance the quality of multi-stream audio by adaptively changing a time interval for transmitting a packet for the first external electronic device 201 and a time interval for transmitting a packet for the second external electronic device 202 within the CIG event 551, according to the difference between the quality of the first link and the quality of the second link.

FIG. 5B illustrates an example that the length of each of the first sub-event 552-1 to the fourth sub-event 552-4 in the first CIS event 552 is the same as the length of each of the first sub-event 553-1 to the fourth sub-event 553-4 in the second CIS event 553, but this is only for convenience of description. For example, although not shown in FIG. 5B, even when the length of each of the first sub-event 552-1 to the fourth sub-event 552-4 in the first CIS event 552 and the length of each of the first sub-event 553-1 to the fourth sub-event 553-4 in the second CIS event 553 are different from each other, the processor 120 may obtain the CIG event 551 including the first CIS event 552 and the second CIS event 553 overlapped with the first CIS event 552, under the condition that the anchor point of each of the first sub-event 552-1 to the fourth sub-event 552-4 in the first CIS event corresponds to the anchor point of each of the first sub-event 553-1 to the fourth sub-event 553-4 in the second CIS event 553. For example, although not shown in FIG. 5B, under the condition that the interval between the anchor points of the first sub-event 552-1 to the fourth sub-event 552-4 in the first CIS event 552 is a multiple of the interval between the anchor points of the first sub-event 553-1 to the fourth sub-event 553-4 in the second CIS event 553, and the offset of each of the anchor points of the first sub-event 552-1 to the fourth sub-event 552-4 in the first CIS event 552 corresponds to the offset of each of the anchor points of the first sub-event 553-1 to the fourth sub-event 553-4 in the second CIS event 553, the processor 120 may obtain the CIG event 551 including the first CIS event 552 and the second CIS event 553 overlapping the first CIS event 552. Such a CIG event 551 is described below with respect to FIG. 5C.

For example, although not shown in FIG. 5B, under the condition that the interval between the anchor points of the first sub-event 553-1 to the fourth sub-event 553-4 in the second CIS event 553 is a multiple of the interval between the anchor points of the first sub-event 552-1 to the fourth sub-event 552-4 in the first CIS event 553, and the offset of each of the anchor points of the first sub-event 552-1 to the fourth sub-event 552-4 in the first CIS event 552 corresponds to the offset of each of the anchor points of the first sub-event 553-1 to the fourth sub-event 553-4 in the second CIS event 553, the processor 120 may obtain the CIG event 551 including the first CIS event 552 and the second CIS event 553 overlapping the first CIS event 552.

Referring to FIG. 5C, as shown in timing diagram 570, the processor 120 may obtain a CIG event 571 including a first CIS event 572 and a second CIS event 573 fully overlapped with the first CIS event 572. For example, the processor 120 may obtain the CIG event 571 by scheduling the first CIS event 572 and the second CIS event 573, so that the first sub-event 572-1 of the first CIS event 572 overlaps the first sub-event 573-1 and the second sub-event 573-2 of the second CIS event 573, the second sub-event 572-2 of the first CIS event 572 overlaps the third sub-event 573-3 and the fourth sub-event 573-4 of the second CIS event 573, the third sub-event 572-3 of the first CIS event 572 overlaps the fifth sub-event 573-5 and the sixth sub-event 573-6 of the second CIS event, and the fourth sub-event 572-4 of the first CIS event 572 overlaps the seventh sub-event 573-7 and the eighth sub-event 573-8 of the second CIS event 573. Unlike the CIG event 501 and the CIG event 551 respectively shown in FIGS. 5A and 5B, the number of sub-events of the first CIS event 572 of the CIG event 571 may be different from the number of sub-events of the second CIS event 573 of the CIG event 571. For example, the interval between the anchor points of the sub-events of the first CIS event 572 of the CIG event 571 may be longer than the interval between the anchor points of the sub-events of the second CIS event 573 of the CIG event 571, as opposed to the CIG event 501 and the CIG event 551 respectively shown in FIGS. 5A and 5B. Unlike the CIG event 501 and the CIG event 551 respectively shown in FIGS. 5A and 5B, the number of times a packet may be transmitted through the first CIS event 572 may be different from the number of times a packet may be transmitted through the second CIS event 573. For example, the interval between the anchor points of the sub-events of the first CIS event 572 of the CIG event 571 may be a multiple of the interval between the anchor points of the sub-events of the second CIS event 573 of the CIG event 571.

The offset of the anchor point of each of the sub-events of the first CIS event 572 of the CIG event 571 may be the same as the offset of the anchor point of each of the sub-events of the second CIS event 573 of the CIG event 571. For example, the position of the anchor point of the first sub-event 572-1 of the first CIS event 572 may be the same as the position of the anchor point of the first sub-event 573-1 of the second CIS event 573, the position of the anchor point of the second sub-event 572-2 of the first CIS event 572 may be the same as the position of the anchor point of the third sub-event 573-3 of the second CIS event 573, the position of the anchor point of the third sub-event 572-3 of the first CIS event 572 may be the same as the position of the anchor point of the fifth sub-event 573-5 of the second CIS event 573, and the position of the anchor point of the fourth sub-event 572-4 of the first CIS event 572 may be the same as the position of the anchor point of the seventh sub-event 573-7 of the second CIS event 573. For example, the anchor point of the second sub-event 573-2 of the second CIS event 573 may be within the first sub-event 572-1 of the first CIS event 572, the anchor point of the fourth sub-event 573-4 of the second CIS event 573 may be within the second sub-event 572-2 of the first CIS event 572, the anchor point of the sixth sub-event 573-6 of the second CIS event 573 may be within the third sub-event 572-3 of the first CIS event 572, and the anchor point of the eighth sub-event 573-8 of the second CIS event 573 may be within the fourth sub-event 572-4 of the first CIS event 572. For example, the sub-events of the first CIS event 572 may be synchronized with the sub-events of the second CIS event 573.

Since the interval between the anchor points of the sub-events of the first CIS event 572 within a time interval for the CIG event 571 is longer than the interval between the anchor points of the sub-events of the second CIS event 573 within the time interval, the time interval may be a time interval that can adaptively select either one of transmission to the first external electronic device 201 and transmission to the second external electronic device 202, for each sub-event of the first CIS event 572.

Referring back to FIG. 3, the processor 120 may adaptively change an initial CIS event (e.g., a CIS event that occurred first between the first CIS event and the second CIS event) in the CIG event including the first CIS event and the second CIS event, in order to uniformly distribute time resources provided for the first CIS event and time resources provided for the second CIS event at least partially overlapping at least part of the first CIS event. For example, the processor 120 may schedule the first CIS event and the second CIS event in the first CIG event so that the anchor point of the first CIS event in the first CIG event occurs simultaneously with an anchor point of the first CIG event and occurs before the anchor point of the second CIS event in the first CIG event, and may schedule the first CIS event and the second CIS event in the second CIG event so that the anchor point of the first CIS event in the second CIG event immediately after the first CIG event occurs simultaneously with the anchor point of the second CIG event and occurs before the anchor point of the second CIS event in the second CIG event. The processor 120 may uniformly distribute the time resources provided for the first CIS event and the time resources provided for the second CIS event at least partially overlapping at least part of the first CIS event, by allocating the initial CIS event in the (2k−1)th CIG event (here, k is a natural number greater than or equal to 1) to the first CIS event, and allocating the initial CIS event in the 2k-th CIG event as the second CIS event. Referring to FIG. 6, as shown in the timing diagram 600, the processor 120 may schedule a CIS event starting at an anchor point 605 of k-th CIG event 601-$k$ as a first CIS event 602 between the first CIS event 602 and a second CIS event 603 partially overlapping part of the first CIS event 602, and schedule a CIS event starting at an anchor point 607 of (k+1)th CIG event 601-(k+1) immediately after the k-th CIG event 601-$k$ as a second CIS event 603 between the first CIS event 602 and the second CIS event 603 partially overlapping part of the first CIS event 602.

Referring back to FIG. 3, an attribute of data in the packet that can be transmitted through the first CIS event, which is the first CIS event in the CIG event, may correspond to an attribute of data included in the packet that may be transmitted through the second CIS event at least partially overlapping at least part of the first CIS event. The processor 120 may obtain the first CIS event for the first packets to be transmitted to the first external electronic device 201 and obtain the second CIS event for the second packets, to be transmitted to the second external electronic device 202 associated with the first external electronic device 201, the second packets corresponding to the first packets, respectively. For example, since the first packets correspond to the second packets, the processor 120 may transmit the first packets and the second packets in various schemes through the first CIS event and the second CIS event at least partially overlapping at least part of the first CIS event.

The processor 120 may transmit the second packets through at least part of the second CIS event, under the condition that the transmission of the first packets is completed through at least part of the first CIS event, which is the first CIS event in the CIG event. Such a scheduling of transmitting the second packets after completing the transmission of the first packets makes it possible to change the number of sub-events in the first CIS event used for transmission of the first packets and change the number of sub-events in the second CIS event used for transmission of the second packets, unlike transmitting the first packets and the second packets using the sequential arrangement, and thus, transmitting the second packets after completing transmission of the first packets in the hybrid arrangement makes it possible to provide more enhanced service than transmitting the first packets and the second packets using the sequential arrangement.

Referring to FIG. 7A, the processor 120 may transmit the second packets to the second external electronic device 202 through at least part of the second CIS event 712 at least partially overlapping at least part of the first CIS event 711, after completing transmission of the first packet 713-1, the first packet 713-2 and the first packet 713-3 to the first external electronic device 201 through at least part of the first CIS event 711 in the CIG event 710. In that case, the number of sub-events in the second CIS event 712 that are available for transmitting the second packets may change depending on when the transmission of the first packets is complete. For example, as shown in the timing diagram 700, when the first packet 713-3 is re-transmitted as opposed to the first packet 713-1 and the first packet 713-2, the processor 120 may transmit the second packets to the second external electronic device 202 through a portion 714 of the second CIS event 712 including four sub-events. As shown in the timing diagram 701, when the transmission of the first packets including the first packet 713-1, the first packet 713-2 and the first packet 713-3 is completed without retransmission, the processor 120 may transmit the second packets to the second external electronic device 202 through a portion 715 of the second CIS event 712 including five sub-events. The hybrid arrangement can provide more adaptive transmission opportunities than the sequential arrangement because the hybrid arrangement makes it possible to change transmission opportunities, as opposed to the sequential arrangement.

The processor 120 may transmit one of the first packets or the second packets in an alternating manner, and then continue to transmit the other, under the condition that either one of the transmission of the first packets and the transmission of the second packets is completed. For example, since such a transmission scheduling enables continuous transmission as well as alternating transmission, transmitting the first packets and the second packets in the hybrid arrangement makes it possible to provide more enhance service than transmitting the first packets and the second packets using the interleaved arrangement.

Referring to FIG. 7A, the processor 120 may perform, alternately in units of sub-events, transmission of the first packets (e.g., the first packet 723-1, the first packet 723-2, and the first packet 723-3) to the first external electronic device 201, and transmission of the second packets (e.g., the second packet 724-1, the second packet 724-2, and the second packet 724-3) to the second external electronic device 202, using the first CIS event 721 in the CIG event 720 and the second CIS event 722 in the CIG event 720 overlapping the first CIS event 721. For example, as shown in the timing diagram 702, the processor 120 may transmit the second packet 724-1 to the second external electronic device 202 through the second CIS event 722 after transmitting the first packet 723-1 to the first external electronic device 201 through the first CIS event 721, transmit the first packet 723-2 to the first external electronic device 201 through the first CIS event 721 after transmitting the second packet 724-1, re-transmit the second packet 724-1 to the second external electronic device 202 through the second CIS event 722 after transmitting the first packet 723-2, and transmit the first packet 723-3 to the first external electronic device 201 after re-transmitting the second packet 724-1. Under the condition that the transmission of the first packet 723-3 succeeds and the retransmission of the second packet 724-1 succeeds, the processor 120 may transmit the second packet 724-2 and the second packet 724-3 to the second external electronic device 202 through a portion 725 of the second CIS event 722 including three sub-events. As opposed to the interleaved arrangement in which it has to transmit the second packet 724-2 and the second packet 724-3 through two sub-events due to the sub-event in the first CIS event 721 (e.g., a sub-event 726) even though the transmission of the first packets has been completed, the hybrid arrangement makes it possible to transmit the second packet 724-2 and the second packet 724-3 through the portion 725 of the second CIS event 722 including the three sub-events. For example, the hybrid deployment can provide more adaptive transmission opportunities than the interleaved arrangement.

Referring back to FIG. 3, an attribute of data in the packet that may be transmitted through the first CIS event, which is an initial CIS event in the CIG event, may be distinguished from an attribute of data included in the packet that may be transmitted through the second CIS event at least partially overlapping at least part of the first CIS event. For example, when both the first CIS event and the second CIS event are obtained, set, or scheduled for packets to be transmitted to an external electronic device, the processor 120 may transmit a packet including data obtained in every cycle to the external electronic device through the first CIS event that starts before the second CIS event and transmit a packet including data obtained based on identifying a designated event to the external electronic device through the second CIS event. A size of a buffer for data transmitted through the first CIS event may be larger than a size of a buffer for data transmitted through the second CIS event, but it is not limited thereto. The processor 120 may transmit a packet for audio continuously provided through the first CIS event that starts before the timing of starting the second CIS event and transmit a packet for audio provided on condition of identifying a designated event through the second CIS event.

Referring to FIG. 7B, the processor 120 may display a user interface 730 of a game executed in the electronic device 101 through a display of the electronic device 101 (e.g., the display module 160 shown in FIG. 1). While displaying the user interface 730, for outputting background music (BGM) of the game and sound effects provided based on a user input received through the user interface 730, using the external electronic device 735, the processor 120, as shown in a timing diagram 740, may obtain a first CIG event 750 including a first CIS event 751 and a second CIS event 752 partially overlapping part of the first CIS event 751 and obtain a second CIG event 760 including a first CIS event 761 and a second CIS event 762 partially overlapping part of the first CIS event 761. For example, the processor 120 may transmit a packet 770 for the BGM continuously outputted while executing the game, to the external electronic device 735 through each of the first CIS event 751 and the first CIS event 761, which is an initial CIS event of each of the first CIG event 750 and the second CIG event 760, and transmit a packet 771 for the sound effect provided on condition of receiving the user input, to the external electronic device 735 through each of the second CIS event 752 and the second CIS event 762. For example, when the user input generating the sound effect is not received for the first CIG event 750, the processor 120, as shown in the timing diagram 740, may transmit a packet 770 to the external electronic device 735 through the first CIS event 751 in the first CIG event 750, and transmit no packet through the second CIS event 752 in the first CIG event 750 or transmit a dummy packet 772 through the second CIS event 752 in the first CIG event 750. In another example, when a user input 780 generating the sound effect is received for the second CIG event 760, as shown in the timing diagram 740, the processor 120 may transmit a packet 770 to the external electronic device 735 through part of the first CIS event 761 in the second CIG event 760, and transmit a packet 771 to the external electronic device 735 through part of the second CIS event 762 in the second CIG event 760 overlapping part of the first CIS event 761. The priority of the packet 771 associated with the user input 780 may be higher than the priority of the packet 770. For example, even when the transmission of the packet 770 is not completed through the part of the first CIS event 761, the processor 120 may transmit the packet 771 through the part of the second CIS event 762 overlapping the part of the first CIS event 761, in response to receiving the user input 780. In other words, the processor 120 may allocate a plurality of CIS events for respectively transmitting packets having different priorities to a single external electronic device such as the external electronic device 735, and schedule the plurality of CIS events to be fully or partially overlapped with each other.

Figure 8:
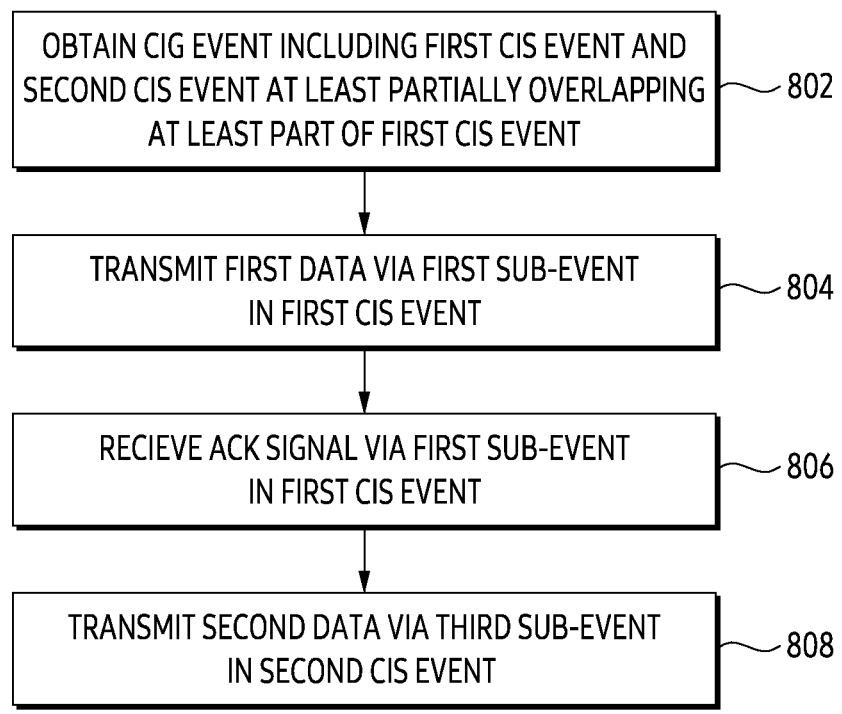
FIG. 8 is a flowchart illustrating a method of transmitting data via a CIG event including a first CIS event and a second CIS event in a hybrid arrangement according to an embodiment of the disclosure.

FIG. 8 is a flowchart illustrating a method of transmitting data via a CIG event including a first CIS event and a second CIS event in a hybrid arrangement according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Referring to FIG. 8, in operation 802, the processor 120 may obtain a CIG event including a first CIS event and a second CIS event at least partially overlapping at least part of the first CIS event. The CIG event may include the first CIS event and the second CIS event in the hybrid arrangement. The first CIS event may be an event used to transmit data to a first external electronic device (e.g., the first external electronic device 201 shown in FIG. 2), and the second CIS event may be an event used to transmit data to a second external electronic device (e.g., the second external electronic device 202 shown in FIG. 2). The first CIS event may include first sub-events, and the second CIS event may include second sub-events at least partially overlapping at least part of the first sub-events. By configuring the anchor point of the second CIS event within the first CIS event initiated from the anchor point of the first CIS event, the processor 120 may obtain the CIG event including the first CIS event including the first sub-events and the second CIS event including the second sub-event at least partially overlapping at least part of the first sub-events, although it is not limited thereto.

According to an embodiment of the disclosure, the processor 120 may perform operation 802 based on identifying that the first external electronic device and the second external electronic device support including the first CIS event and the second CIS event in the CIG event in the hybrid arrangement. For example, based on receiving capability information of the first external electronic device from the first external electronic device and receiving capability information of the second external electronic device from the second external electronic device, the processor 120 may determine including the first CIS event and the second CIS event in the CIG event in the hybrid arrangement, and execute operation 802 based on the determination. However, it is not limited thereto.

In operation 804, the processor 120 may transmit first data to the first external electronic device through the first sub-event in the first CIS event. The first sub-event may be one of the first sub-events in the first CIS event. The first sub-event may overlap one of the second sub-events in the second CIS event or may not overlap all the second sub-events. When the first sub-event does not overlap all of the second sub-event, the last sub-event of the second sub-event may not overlap all of the first sub-events.

In operation 806, the processor 120 may receive an acknowledgement signal from the first external electronic device through the first sub-event in the first CIS event. For example, the first external electronic device may set NESN (nextExpectedSeqNum) in the packet to SN (transmitSeqNum), based on receiving the packet including the first data through the first sub-event, and transmit a response packet including the set SN to the electronic device 101 through the first sub-event as the acknowledgement signal. The processor 120 may identify that the first data is normally received by the first external electronic device through the first sub-event based on receiving the acknowledgement signal.

In operation 808, the processor 120 may transmit second data to the second external electronic device through a third sub-event in the second CIS event, based on receiving the acknowledgement signal from the first external electronic device through the first sub-event. For example, the third sub-event in the second CIS event may be a sub-event of the second sub-events in the second CIS event overlapping the second sub-event immediately after the first sub-event among the first sub-events. The third sub-event in the second CIS event may be a sub-event initiating the second CIS event, although it is not limited thereto. The processor 120 may transmit, to the second external electronic device, at least one packet including the second data through at least one sub-event including the third sub-event in the second CIS event, although it is not limited thereto.

Although not shown in FIG. 8, the processor may, based on receiving the acknowledgement signal from the first external electronic device through the first sub-event, cease transmitting data to the first external electronic device through all the remaining sub-events in the first CIS event in the CIG event.

As described above, the electronic device 101 may adaptively distribute the time resources for transmitting data to the first external electronic device and the time resources for transmitting data to the second external electronic device, according to a change in at least one of a state of a first link between the first external electronic device and the electronic device 101 or a state of a second link between the second external electronic device and the electronic device 101, by configuring the CIG event including the first CIS event and the second CIS event in the hybrid arrangement. For example, the electronic device 101 may configure the CIG event including the first CIS event and the second CIS event in the hybrid arrangement, thereby increasing the amount of time resources that may be allocated to each of the first CIS event and the second CIS event.

Figure 9A:
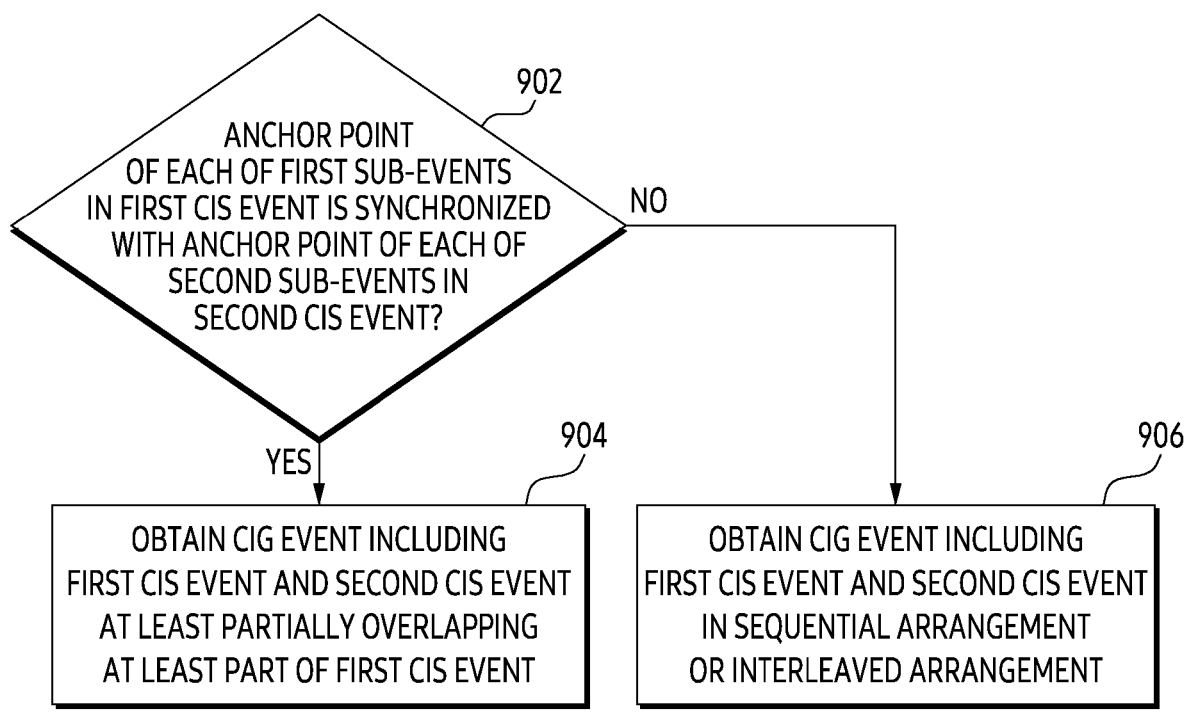
FIG. 9A is a flowchart illustrating a method of obtaining the CIG event including the first CIS event and the second CIS event in a hybrid arrangement, based on synchronization of an anchor point of each of the first sub-events in the first CIS event and an anchor point of each of the second sub-events in the second CIS event, according to an embodiment of the disclosure.

FIG. 9A is a flowchart illustrating a method of obtaining the CIG event including the first CIS event and the second CIS event in the hybrid arrangement, based on synchronization of an anchor point of each of the first sub-events in the first CIS event and an anchor point of each of the second sub-events in the second CIS event, according to an embodiment of the disclosure. This method may be executed by the electronic device 101 shown in FIG. 1, the electronic device 101 shown in FIG. 2, the electronic device 101 shown in FIG. 3, or the processor 120 of the electronic device 101.

Operations 902 to 904 of FIG. 9A may be associated with operation 802 of FIG. 8.

Referring to FIG. 9A, in operation 902, the processor 120 may identify whether or not the anchor point of each of the first sub-events in the first CIS event defined through the description of FIG. 8 is synchronized with the anchor point of each of the second sub-events in the second CIS event defined through the description of FIG. 8. When the anchor point of each of the first sub-events is synchronized with the anchor point of each of the second sub-events, it may mean that an offset of the anchor point of each of the first sub-events coincides with an offset of each of the anchor points in the second sub-events, and that an interval between the anchor points of the first sub-events is a multiple of an interval between anchor points of the second sub-events. When the anchor point of each of the first sub-events is synchronized with the anchor point of each of the second sub-events, it may mean that the offset of the anchor point of each of the first sub-events coincides with the offset of the anchor point of each of the second sub-events, and that the interval between the anchor points of the second sub-events is a multiple of the interval between the anchor points of the first sub-events. When the anchor point of each of the first sub-events is synchronized with the anchor point of each of the second sub-events, it may mean that regardless (or independently) of the length of each of the first sub-events and the length of each of the second sub-events, it is possible to perform scheduling to overlap at least part of the first sub-events and at least part of the second sub-events, so the processor 120 may identify whether the anchor point of each of the first sub-events is synchronized with the anchor point of each of the second sub-events.

The processor 120 may execute operation 904 on condition that the anchor point of each of the first sub-events is synchronized with the anchor point of each of the second sub-events, and execute operation 906 on condition that the anchor point of each of the first sub-events is not synchronized with the anchor point of each of the second sub-events.

In operation 904, the processor 120 may obtain the CIG event including the first CIS event and the second CIS event partially overlapping at least part of the first CIS event, based on identifying that the anchor point of each of the first sub-events is synchronized with the anchor point of each of the second sub-events. For example, the processor 120 may obtain the CIG event including the first CIS event and the second CIS event in the hybrid arrangement.

In operation 906, the processor 120 may obtain the CIG event including the first CIS event and the second CIS event either in the sequential arrangement or in the interleaved arrangement, based on identifying that the anchor point of each of the first sub-events is not synchronized with the anchor point of each of the second sub-events.

Figure 9B:
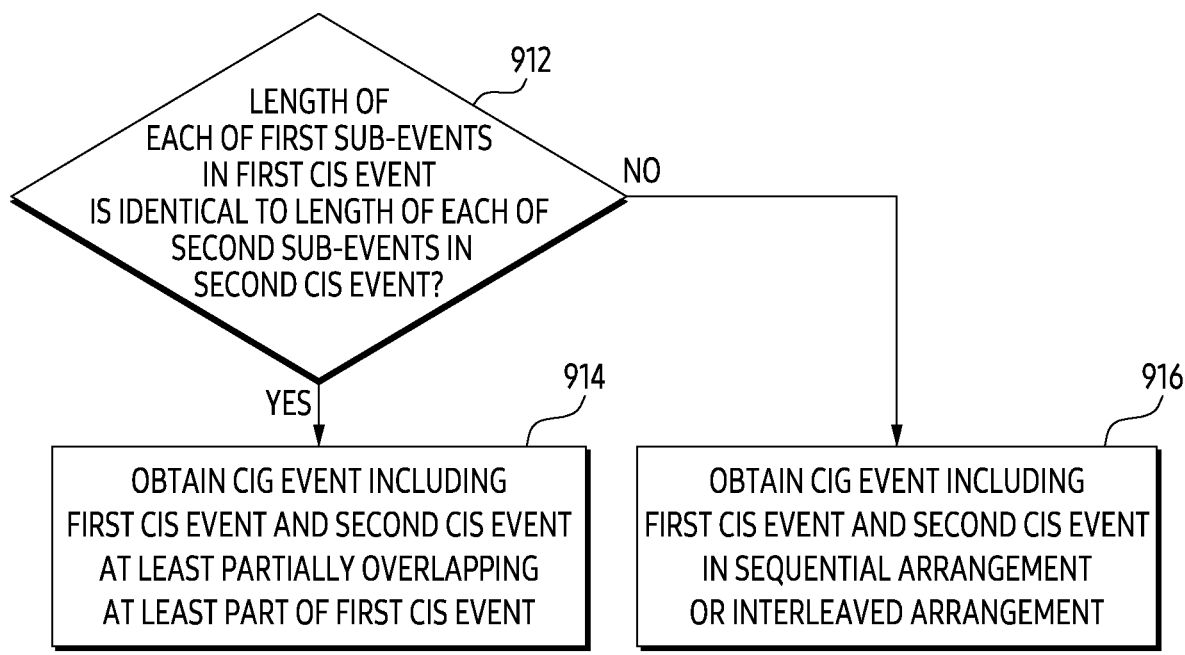
FIG. 9B is a flowchart illustrating a method of obtaining the CIG event including the first CIS event and the second CIS event in a hybrid arrangement, based on the length of each of the first sub-events in the first CIS event and the length of each of the second sub-events in the second CIS event, according to an embodiment of the disclosure.

FIG. 9B is a flowchart illustrating a method of obtaining the CIG event including the first CIS event and the second CIS event in the hybrid arrangement, based on the length of each of the first sub-events in the first CIS event and the length of each of the second sub-events in the second CIS event according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Operations 912 to 914 of FIG. 9B may be associated with operation 802 of FIG. 8.

Referring to FIG. 9B, in operation 912, the processor 120 may identify whether a length of each of the first sub-events in the first CIS event defined through the description of FIG. 8 is identical to a length of each of the second sub-events in the second CIS event defined through the description of FIG. 8. When the length of each of the first sub-events is identical to the length of each of the second sub-events, it may mean that it is possible to perform scheduling to overlap at least part of the first sub-events and at least part of the second sub-events, so the processor 120 may identify whether the length of each of the first sub-events is identical to the length of each of the second sub-events. The processor 120 may identify whether the length of each of the first sub-events is identical to the length of each of the second sub-events, by identifying a parameter (e.g., SE_length) of the first CIS event indicating the length of each of the first sub-events in the first CIS event and a parameter of the second CIS event indicating the length of each of the second sub-events in the second CIS event.

The processor 120 may execute operation 914 on condition that the length of each of the first sub-events is identical to the length of each of the second sub-events, and processor 120 may execute operation 916 on condition that the length of each of the first sub-events is different from the length of each of the second sub-events.

In operation 912, the processor 120 may further identify whether a start timing of each of the first sub-events is synchronized with a start timing of each of the second sub-events. For example, when the length of each of the first sub-events is identical to the length of each of the second sub-events, and the start timing of each of the first sub-events is synchronized with the start timing of each of the second sub-events, it may mean that it possible to perform scheduling to overlap at least part of the first sub-events and at least part of the second sub-events, so the processor 120 may execute a comparison between the length of each of the first sub-events and the length of each of the second sub-events and a comparison between the start timing of each of the first sub-events and the start timing of each of the second sub-events. The processor 120 may execute operation 914 on condition that the length of each of the first sub-events is identical to the length of each of the second sub-events and the start timing of each of the first sub-events is synchronized with the start timing of each of the second sub-events, otherwise execute operation 916.

In operation 914, the processor 120 may obtain the CIG event including the first CIS event and the second CIS event at least partially overlapping at least part of the first CIS event, based on identifying that the length of each of the first sub-events is identical to the length of each of the second sub-events. For example, the processor 120 may obtain the CIG event including the first CIS event and the second CIS event in the hybrid arrangement.

In operation 916, the processor 120 may obtain the CIG event including the first CIS event and the second CIS event either in the sequential arrangement or the interleaved arrangement, based on identifying that the length of each of the first sub-events is different from the length of each of the second sub-events.

Figure 10:
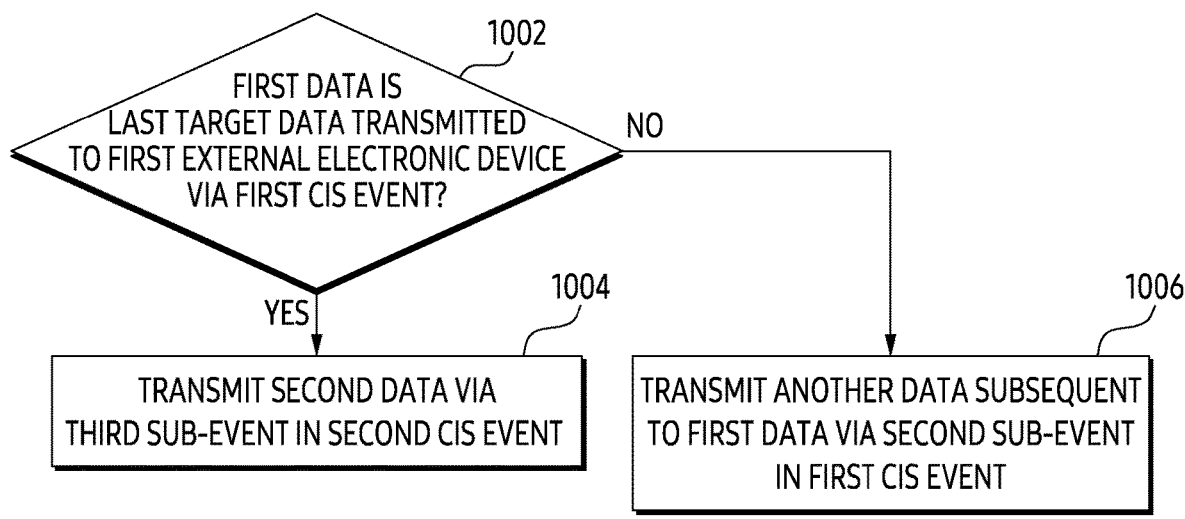
FIG. 10 is a flowchart illustrating a method of transmitting data within a time interval in which at least part of the first CIS event overlaps at least part of the second CIS event, according to an embodiment of the disclosure.

FIG. 10 is a flowchart illustrating a method of transmitting data within a time interval in which at least part of the first CIS event overlaps at least part of the second CIS event, according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Operations 1002 and 1006 of FIG. 10 may be associated with the operation 808 of FIG. 8.

Referring to FIG. 10, in operation 1002, after executing operation 806, the processor 120 may identify whether the first data transmitted through operation 804 is the last target data transmitted to the first external electronic device through the first CIS event. For example, when it is received the acknowledgement signal for the first data, which is the last target data, in operation 806, it may mean that transmission of all data scheduled for the first CIS event is completed. When the transmission of all scheduled data for the first CIS event is completed, there is no need to transmit data through the second sub-event in the first CIS event immediately after the first sub-event, so the processor 120 may identify whether the first data is the last target data. On condition that the first data is the last target data, the processor 120 may execute operation 1004, while on condition that the first data is not the last target data, the processor 120 may execute operation 1006.

In operation 1004, based on identifying that the first data is the last target data, the processor 120 may transmit second data through the third sub-event in the second CIS event at least partially overlapping at least part of the first CIS event. For example, operation 1004 may correspond to operation 808 of FIG. 8.

In operation 1006, based on identifying that the first data is not the last target data, the processor 120 may transmit another data subsequent to the first data through the second sub-event in the first CIS event.

As described above, when transmission of all data scheduled for the first CIS event has been completed before the end of the first CIS event, the electronic device 101 may transmit data to the second external electronic device through sub-events in the second CIS event overlapping the remaining sub-events instead of the remaining sub-events in the first CIS event. In other words, the electronic device 101 may use the CIG event including the first CIS event and the second CIS event in the hybrid arrangement to increase the number of transmissions to the second external electronic device through the second CIS event.

Figure 11:
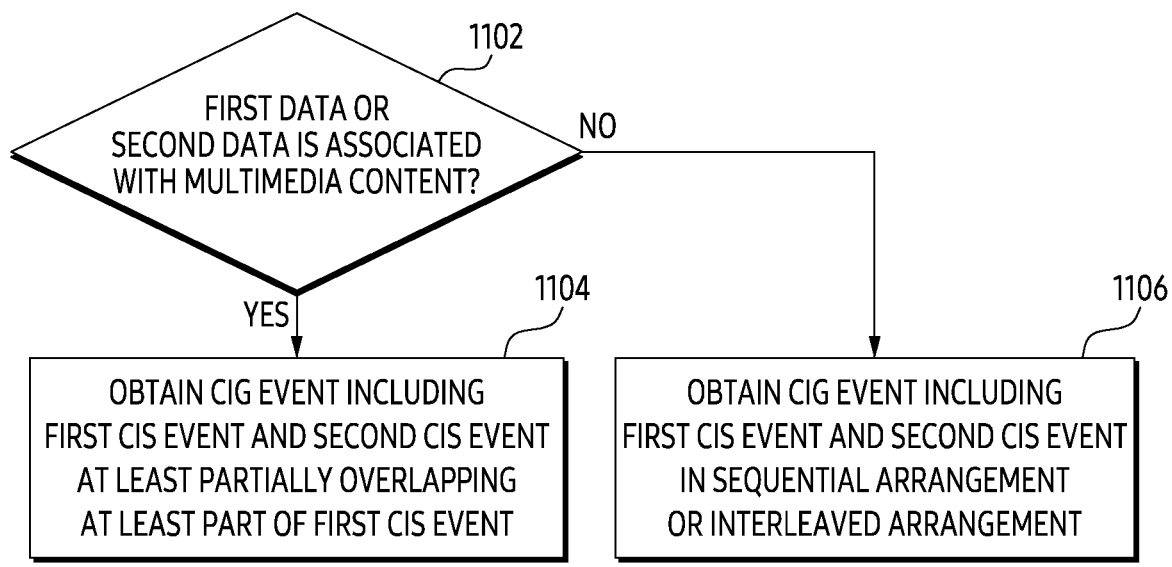
FIG. 11 is a flowchart illustrating a method of obtaining the CIG event including the first CIS event and the second CIS event in a hybrid arrangement based on attributes of data, according to an embodiment of the disclosure.

FIG. 11 is a flowchart illustrating a method of obtaining the CIG event including the first CIS event and the second CIS event in the hybrid arrangement, based on attributes of data, according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Operations 1102 to 1104 of FIG. 11 may be associated with operation 802 of FIG. 8.

Referring to FIG. 11, in operation 1102, the processor 120 may identify whether the first data or the second data is associated with a multimedia content. For example, the processor 120 may identify whether the first data or the second data is associated with the multimedia content in order to identify whether a size of the first data to be transmitted through the first CIS event or a size of the second data to be transmitted through the second CIS event requires configuring the CIG event including the first CIS event and the second CIS event in the hybrid arrangement. In another example, the processor 120 may identify whether the first data or the second data is associated with the multimedia content in order to identify whether the load of the first external electronic device for processing the first data to be transmitted through the first CIS event or the load of the second external electronic device for processing the second data to be transmitted through the second CIS event requires configuring the CIG event including the first CIS event and the second CIS event in the hybrid arrangement. In another example, the processor 120 may identify whether the first data or the second data is associated with the multimedia content in order to identify whether the quality of service (QoS) of the first data to be transmitted through the first CIS event or the quality of service (QoS) of the second data to be transmitted through the second CIS event requires configuring the CIG event including the first CIS event and the second CIS event in the hybrid arrangement. In another example, the processor 120 may identify whether the first data or the second data is associated with the multimedia content in order to identify whether multi-stream audio is provided through the first external electronic device and the second external electronic device. However, it is not limited thereto.

The processor 120 may execute operation 1104 on condition that the first data or the second data is associated with the multimedia content, and may execute operation 1106 on condition that the first data and the second data are not associated with the multimedia content.

In operation 1104, the processor 120 may obtain the CIG event including the first CIS event and the second CIS event at least partially overlapping at least part of the first CIS event, based on identifying that the first data or the second data is associated with the multimedia content. For example, the processor 120 may obtain the CIG event including the first CIS event and the second CIS event in the hybrid arrangement.

In operation 1106, the processor 120 may obtain the CIG event including the first CIS event and the second CIS event either in the sequential arrangement or in the interleaved arrangement, based on identifying that the first data and the second data are not associated with the multimedia content. For example, when the sizes of the first data and the second data are relatively small, the processor 120 may obtain the CIG event in the sequential arrangement or in the interleaved arrangement.

Figure 12:
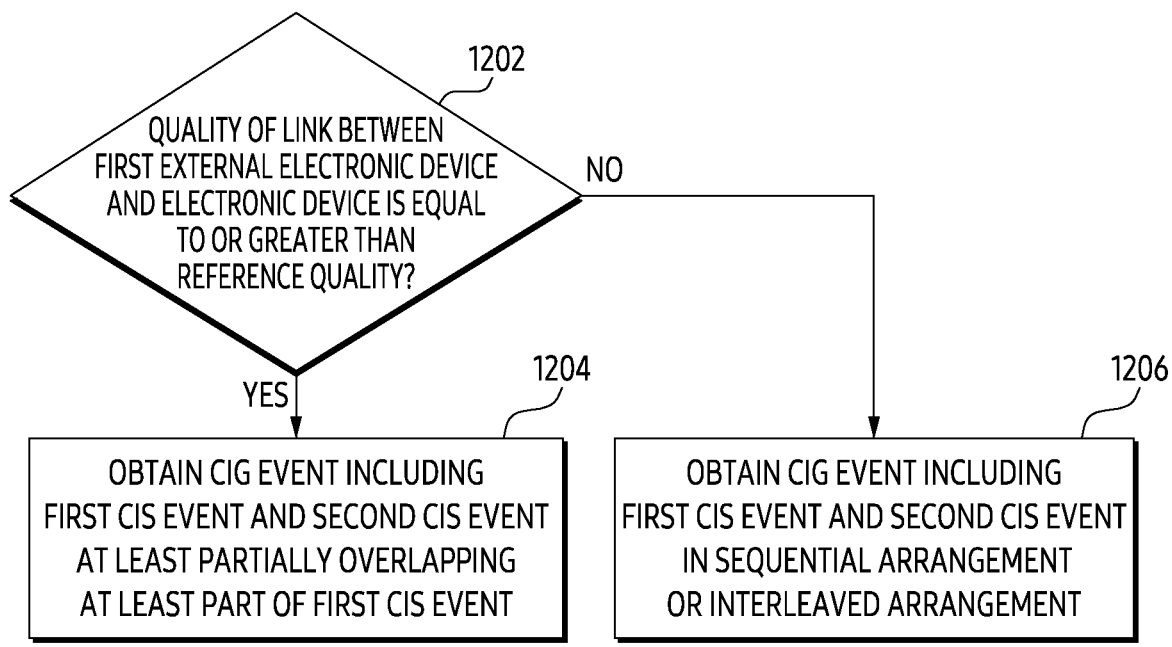
FIG. 12 is a flowchart illustrating a method of obtaining the CIG event including the first CIS event and the second CIS event in a hybrid arrangement, based on the quality of a link between the first external electronic device and the electronic device, according to an embodiment of the disclosure.

FIG. 12 is a flowchart illustrating a method of obtaining the CIG event including the first CIS event and the second CIS event in the hybrid arrangement, based on the quality of a link between the first external electronic device and the electronic device, according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Operations 1202 to 1204 of FIG. 12 may be associated with operation 802 of FIG. 8.

Referring to FIG. 12, in operation 1202, the processor 120 may identify whether the quality of the link between the first external electronic device and the electronic device 101 (or the quality of the link between the second external electronic device and the electronic device 101) is equal to or greater than a reference quality. For example, when the quality of the link between the first external electronic device and the electronic device 101 is below the reference quality, it may mean that the number of times of transmitting data through the second CIS event overlapping at least part of the first CIS event is limited, so the processor 120 may identify whether the quality of the link between the first external electronic device and the electronic device 101 is equal to or greater than the reference quality. The processor 120 may execute operation 1204 on condition that the quality of the link between the first external electronic device and the electronic device 101 is equal to or higher than the reference quality, and may execute operation 1206 on condition that the quality of the link between the first external electronic device 101 and the electronic device 101 is below the reference quality.

In operation 1204, the processor 120 may obtain the CIG event including the first CIS event and the second CIS event at least partially overlapping at least part of the first CIS event, based on identifying that the quality of the link between the first external electronic device and the electronic device 101 is equal to or greater than the reference quality. For example, the processor 120 may obtain the CIG event including the first CIS event and the second CIS event in the hybrid arrangement.

In operation 1206, the processor 120 may obtain the CIG event including the first CIS event and the second CIS event in the sequential arrangement or in the interleaved arrangement, based on identifying that the quality of the link between the first external electronic device and electronic device 101 is below the reference quality.

As described above, the electronic device 101 may obtain the CIG event including the first CIS event and the second CIS event in the hybrid arrangement, based on identifying that the quality of the link between the first external electronic device and the electronic device 101 is equal to or greater than the reference quality, in order to uniformly distribute the time resources used for transmission from the electronic device 101 to the first external electronic device and the time resources used for transmission from the electronic device 101 to the second external electronic device.

Figure 13:
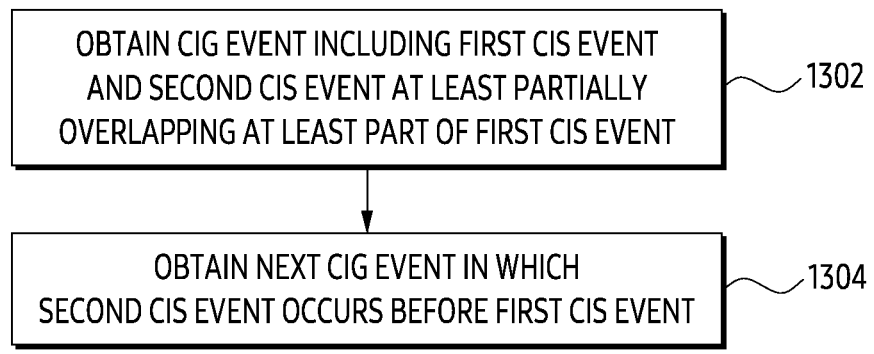
FIG. 13 is a flowchart illustrating a method of allocating an initial CIS event in a CIG event according to an embodiment of the disclosure.

FIG. 13 is a flowchart illustrating a method of allocating an initial CIS event in the CIG event according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Referring to FIG. 13, in operation 1302, the processor 120 may obtain the CIG event including the first CIS event and the second CIS event partially overlapping part of the first CIS event. For example, the first CIS event may be a CIS event that occurs before the second CIS event in the CIG event.

In operation 1304, the processor 120 may obtain a next CIG event immediately after the CIG event, in which the second CIS event partially overlapping part of the first CIS event occurs before the first CIS event. For example, when an anchor point of the CIG event obtained in operation 1302 is an anchor point of the first CIS event, the processor 120 may schedule the anchor point of the next CIG event obtained in operation 1304 as an anchor point of the second CIS event, in order to uniformly distribute the time resources allocated for the first CIS event and the time resources allocated for the second CIS event. When the initial CIS event of the CIG event is the first CIS event, the processor 120 may set the initial CIS event of the next CIG event as the second CIS event.

As described above, the electronic device 101 can make a uniform distribution of different CIS events by scheduling the initial CIS event of k-th CIG event and the initial CIS event of (k+1)th CIG event immediately after the k-th CIG event, as the different CIS events.

Figure 14:
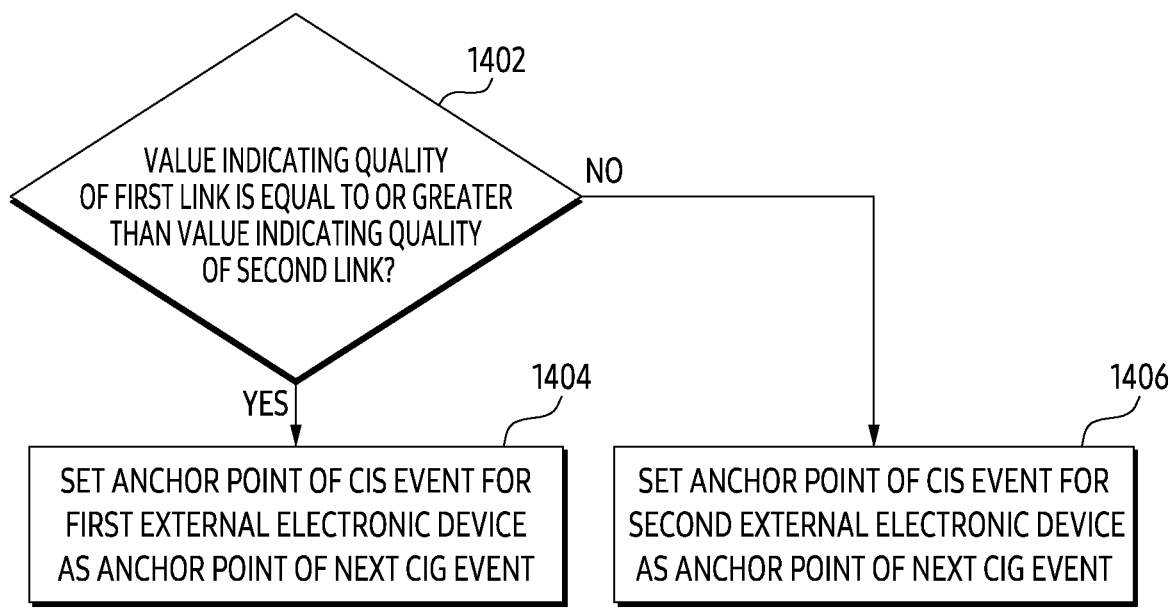
FIG. 14 is a flowchart illustrating a method of allocating an initial CIS event in a CIG event, based on the quality of a first link between a first external electronic device and an electronic device, and the quality of a second link between a second external electronic and an electronic device, according to an embodiment of the disclosure.

FIG. 14 is a flowchart illustrating a method of allocating the initial CIS event in the CIG event based on the quality of the first link between the first external electronic device and the electronic device and the quality of the second link between the second external electronic device and the electronic device according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Referring to FIG. 14, in operation 1402, the processor 120 may identify whether a value indicating the quality of the first link between the first external electronic device and the electronic device 101 is equal to or greater than a value indicating the quality of the second link between the second external electronic device and the electronic device 101. For example, the processor 120 may identify whether the value indicating the quality of the first link is equal to or greater than the value indicating the quality of the second link, in order to further secure the time resources for transmission through the second link when the quality of the first link is better than the quality of the second link, and further secure the time resources for transmission through the first link when the quality of the second link is better than the quality of the first link. The processor 120 may execute operation 1404 on condition that the value indicating the quality of the first link is equal to or greater than the value indicating the quality of the second link, and execute operation 1406 on condition that the value indicating the quality of the first link is less than the value indicating the quality of the second link.

In operation 1404, the processor 120 may set an anchor point of the CIS event (e.g., the first CIS event) for the first external electronic device as an anchor point of the next CIG event, based on identifying that the value indicating the quality of the first link is equal to or greater than the value indicating the quality of the second link. For example, in order to further secure the time resources for transmission through the second link (e.g., transmission through the second CIS event), the processor 120 may set the initial CIS event of the next CIG event as the first CIS event.

In operation 1406, the processor 120 may set an anchor point of the CIS event (e.g., the second CIS event) for the second external electronic device as an anchor point of the next CIG event, based on identifying that the value indicating the quality of the first link is less than the value indicating the quality of the second link. For example, in order to further the secure time resources for transmission through the first link (e.g., transmission through the first CIS event), the processor 120 may set the initial CIS event of the next CIG event as the second CIS event.

As described above, by identifying the CIS event having a better link quality from the first CIS event and the second CIS event, and setting the identified CIS event as an initial event of the CIG event, the electronic device 101 may complete transmission of data through the identified CIS event before the end of the CIS event and transmit data through another CIS event. In other words, the electronic device 101 may control transmissions via the CIG event including the first CIS event and the second CIS event in the hybrid deployment depending on the state of the links, thereby distributing the time resources for data transmission according to the quality of each of the links.

According to various embodiments of the disclosure, as opposed to the illustration of FIG. 14, the processor 120 may execute operation 1406 on condition that in operation 1402, the value indicating the quality of the first link is equal to or greater than the value indicating the quality of the second link, and execute operation 1404 on condition that the value indicating the quality of the first link is less than the value indicating the quality of the second link.

Figure 15:
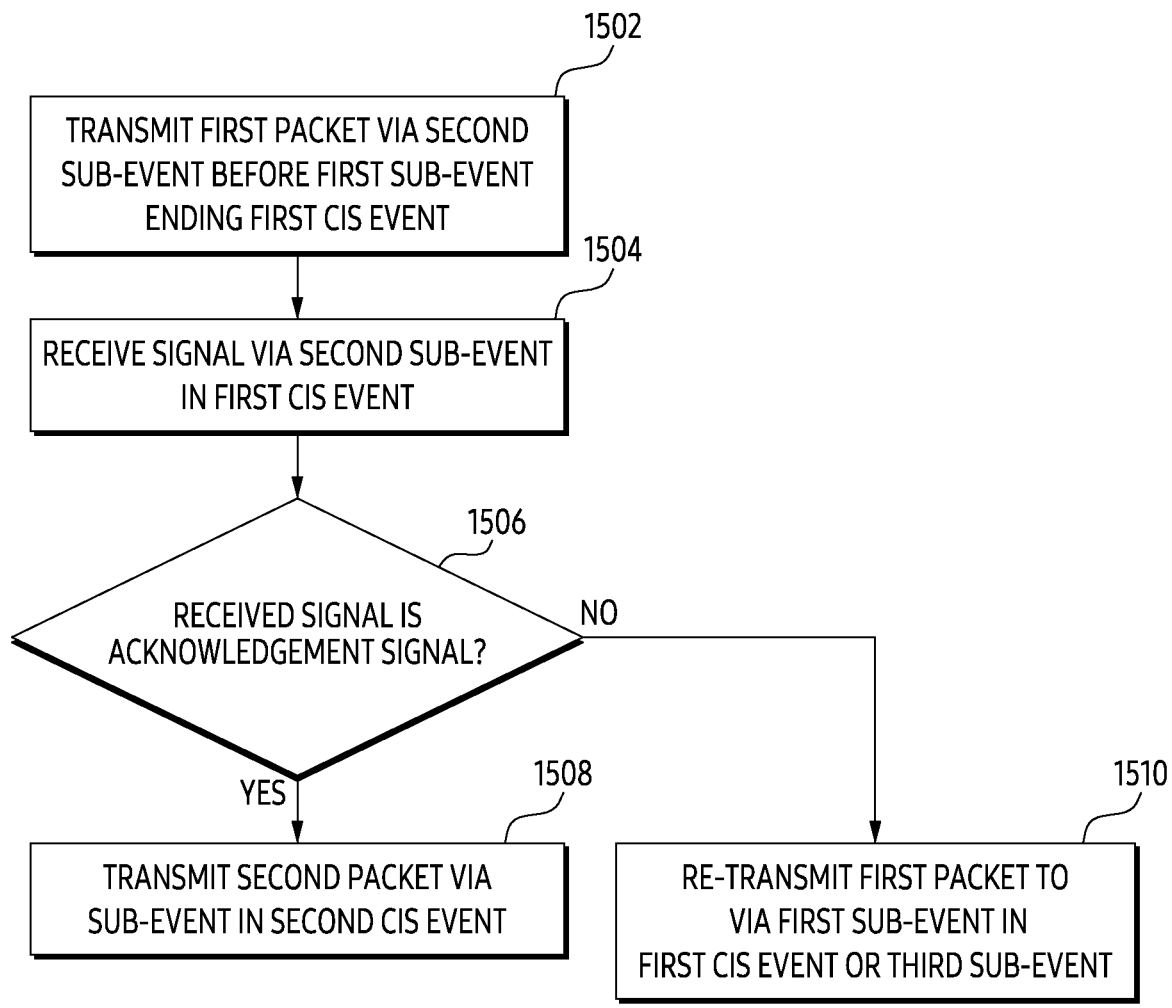
FIG. 15 is a flowchart illustrating a method of transmitting packets via a CIG event with a hybrid arrangement according to an embodiment of the disclosure.

FIG. 15 is a flowchart illustrating a method of transmitting packets through the CIG event having the hybrid arrangement according to an embodiment of the disclosure. This method may be executed by the electronic device 101 illustrated in FIG. 1, the electronic device 101 illustrated in FIG. 2, the electronic device 101 illustrated in FIG. 3, or the processor 120 of the electronic device 101.

Referring to FIG. 15, in operation 1502, the processor 120 may transmit a first packet, which is the last packet of at least one target packet allocated to transmit to the first external electronic device in the first CIS event in the CIG event in hybrid arrangement, to the first external electronic device, through the second sub-event before the first sub-event, the second sub-event ending the first CIS event. For example, the second sub-event may be a sub-event overlapping one of sub-events in the second CIS event in the CIG event.

In operation 1504, the processor 120 may receive a signal from the first external electronic device through the second sub-event in the first CIS event. For example, the signal may be a response packet to the first packet. For example, the signal may be an acknowledgement signal or a non-acknowledgement signal.

In operation 1506, the processor 120 may identify whether the signal is the acknowledgement signal. For example, the processor 120 may identify whether the signal is the acknowledgement signal or the non-acknowledgement signal through an SN in the response packet. The processor 120 may execute operation 1508 on condition that the signal is the acknowledgement signal, and execute operation 1510 on condition that the signal is the non-acknowledgement signal.

In operation 1508, the processor 120 may transmit a second packet to the second external electronic device through one of the sub-events in the second CIS event, in response to identifying that the signal is the acknowledgement signal. For example, when the signal is the acknowledgement signal, it may mean that the transmission scheduled for the first CIS event is completed before the end of the first CIS event, so the processor 120 may transmit the second packet to the second external electronic device through the sub-event.

In operation 1510, in response to identifying that the signal is the non-acknowledgement signal, the processor 120 may re-transmit the first packet to the first external electronic device through the first sub-event after the second sub-event or a third sub-event immediately after the second sub-event. For example, when the signal is the non-acknowledgement signal, the processor 120 may re-transmit the first packet to complete the transmission scheduled for the first CIS event.

According to an embodiment of the disclosure, the electronic device, method, and computer-readable storage medium can provide a robust service against the change in quality of at least one of a link between the electronic device and the first external electronic device or a link between the electronic device and the second external electronic device, by communicating with each of the first external electronic device and the second external electronic device via a connected isochronous group (CIG) event that includes a first connected isochronous stream (CIS) event including first sub-events and a second CIS event including second sub-events at least partially overlapping at least part of the first sub-events.

As described above, according to an embodiment of the disclosure, an electronic device (e.g., an electronic device 101) may comprise communication circuitry (e.g., a communication circuitry 190) for Bluetooth low energy (BLE); at least one memory (e.g., a memory 130) configured to store instructions; and at least one processor (e.g., a processor 120) operably coupled with the communication circuitry and the at least one memory, the at least one processor being configured, when executing the instructions, to obtain a connected isochronous group (CIG) event including a first connected isochronous stream (CIS) event including first sub-events and a second CIS event including second sub-events that are at least partially overlapped with at least part of the first sub-events; and based on receiving an acknowledgement (ACK) signal on first data transmitted to a first external electronic device via a first sub-event among the first sub-events, transmit second data to a second external electronic device via a third sub-event among the second sub-events overlapping a second sub-event immediately after the first sub-event among the first sub-events.

The at least one processor, when executing the instructions, may be configured to obtain, based on identifying that an anchor point of each of the first sub events is synchronized with an anchor point of each of the second sub events, the CIG event including the first CIS event including the first sub-events and the second CIS event including the second sub-events at least partially overlapping at least part of the first sub-events. The at least one processor, when executing the instructions, may be further configured to obtain, based on identifying that the anchor point of each of the first sub events is not synchronized with the anchor point of each of the second sub events, the CIG event including the first CIS event and the second CIS event in the sequential arrangement or the CIG event including the first CIS event and the second CIS event in the interleaved arrangement.

The at least one processor, when executing the instructions, may be further configured to obtain, based on identifying that a length of each of the first sub events is identical to a length of each of the second sub events, the CIG event including the first CIS event including the first sub-events and the second CIS event including the second sub-events at least partially overlapping at least part of the first sub-events. The at least one processor, when executing the instructions, may be further configured to obtain, based on identifying that the length of each of the first sub-events is different from the length of each of the second sub-events, the CIG event including the first CIS event and the second CIS event in the sequential arrangement or the CIG event including the first CIS event and the second CIS event in the interleaved arrangement.

The at least one processor, when executing the instructions, may be configured to obtain the CIG event, by configuring an anchor point of the second CIS event within the first CIS event initiated from an anchor point of the first CIS event, the CIG event including the first CIS event including the first sub-events and the second CIS event including the second sub-events at least partially overlapping at least part of the first sub-events.

The at least one processor, when executing the instructions, may be configured to transmit, based on receiving from the first external electronic device via the first sub-event the acknowledgement signal on the first data that is the last target data transmitted to the first external electronic device via the first CIS event, the second data to the second external electronic device via the third sub-event among the second sub-events.

The third sub-event overlapping the second sub-event may be a sub-event that initiates the second CIS event. A part of the second sub-events may not overlap all of the first sub-events.

The at least one processor, when executing the instructions, may be configured to obtain, based on receiving capability information of the first external electronic device from the first external electronic device and receiving capability information of the second external electronic device from the second external electronic device, the CIG event including the first CIS event including the first sub-events and the second CIS event including the second sub-events at least partially overlapping the at least part of the first sub-events.

The at least one processor, when executing the instructions, may be configured to obtain, based on identifying that the first data or the second data is associated with a multimedia content, the CIG event including the first CIS event including the first sub-events and the second CIS event including the second sub-events at least partially overlapping the at least part of the first sub-events.

The at least one processor, when executing the instructions, may be configured to obtain, based on identifying that the quality of a link between the first external electronic device and the electronic device is equal to or more than a reference quality, the CIG event including the first CIS event including the first sub-events and the second CIS event including the second sub-events at least partially overlapping the at least part of the first sub-events.

The first CIS event may be allocated for the first external electronic device, the second CIS event may be allocated for the second external electronic device, an anchor point of the first CIS event among the anchor point of the first CIS event and the anchor point of the second CIS event may be an anchor point of the CIG event, and the at least one processor, when executing the instructions, may be further configured to obtain another CIG event next to the CIG event, wherein the other CIG event may include a third CIS event and a fourth CIS event, the third CIS event including third sub events and being allocated for the first external electronic device, the fourth CIS event including fourth sub events at least partially overlapped with at least part of the third sub events and being allocated for the second external electronic device, and wherein an anchor point of the fourth CIS event among an anchor point of the third CIS event and the anchor point of the fourth CIS event is an anchor point of the other CIG event.

The at least one processor, when executing the instructions, may be configured to, based on receiving the acknowledgement signal via the first sub-event, cease transmitting data to the first external electronic device via all of the remaining sub-events in the first CIS event.

The first sub-event may be a sub-event not overlapping with the second sub-events, and a priority of a first service provided through the first data may be higher than a priority of second service provided with the second data.

As described above, a method for operating an electronic device with a communication circuitry for Bluetooth low energy (BLE) according to an embodiment of the disclosure may comprise obtaining a connected isochronous group (CIG) event including a first connected isochronous stream (CIS) event that includes first sub events and a second CIS event that includes second sub events that are at least partially overlapped with at least part of the first sub events; and transmitting, based on receiving an acknowledgement (ACK) signal for first data transmitted to a first external electronic device via a first sub event among the first sub events, second data to a second external electronic device via a third sub event among the second sub events, the third sub event being overlapped with a second sub event immediately after the first sub event among the first sub events.

non-transitory computer-readable storage medium according to an embodiment of the disclosure, may store one or more programs including instructions that, when executed by at least one processor of an electronic device with a communication circuitry for Bluetooth low energy, cause the electronic device to obtain a connected isochronous group (CIG) event including a first connected isochronous stream (CIS) event that includes first sub events and a second CIS event that includes second sub events that are at least partially overlapped with at least part of the first sub events; and transmit, based on receiving an acknowledgement (ACK) signal for first data transmitted to a first external electronic device via a first sub event among the first sub events, second data to a second external electronic device via a third sub event among the second sub events, the third sub event being overlapped with a second sub event immediately after the first sub event among the first sub events.

An electronic device according to an embodiment of the disclosure may comprise a communication circuit for Bluetooth low energy (BLE), and a processor, wherein the processor is configured to transmit, to a first external electronic device, a first packet that is the last packet from at least one target packet allocated for transmitting to the first external electronic device within a first connected isochronous stream (CIS) event in a connected isochronous group (CIG) event, via a second sub event before a first sub event ending the first CIS event; transmit, in response to receiving an acknowledgement (ACK) signal for the first packet via the second sub event from the first external electronic device, a second packet to a second external electronic device via a sub event among sub events in a second CIS event in the CIG event; and re-transmit, in response to a non-acknowledgement (NACK) signal for the first packet via the second sub event from the first external electronic device, the first packet to the first external electronic device via a sub event immediately after the second sub event among the remaining sub events in the first CIS event.

According to an embodiment of the disclosure, a method for operating an electronic device with a communication circuitry for Bluetooth low energy (BLE) may comprise transmitting, to a first external electronic device, a first packet that is the last packet from at least one target packet allocated for transmitting to the first external electronic device within a first connected isochronous stream (CIS) event in a connected isochronous group (CIG) event, via a second sub event before a first sub event ending the first CIS event; transmitting, in response to receiving an acknowledgement (ACK) signal for the first packet via the second sub event from the first external electronic device, a second packet to a second external electronic device via a sub event among sub events in a second CIS event in the CIG event; and re-transmitting, in response to a non-acknowledgement (NACK) signal for the first packet via the second sub event from the first external electronic device, the first packet to the first external electronic device via a sub event immediately after the second sub event among the remaining sub events in the first CIS event.

According to an embodiment of the disclosure, a non-transitory computer-readable storage medium may store one or more programs including instructions that, when executed by at least one processor of an electronic device with a communication circuitry for a BLE, cause the electronic device to transmit, to a first external electronic device, a first packet that is the last packet from at least one target packet allocated for transmitting to the first external electronic device within a first connected isochronous stream (CIS) event in a connected isochronous group (CIG) event, via a second sub event before a first sub event ending the first CIS event; transmit, in response to receiving an acknowledgement (ACK) signal for the first packet via the second sub event from the first external electronic device, a second packet to a second external electronic device via a sub event among sub events in a second CIS event in the CIG event; and re-transmit, in response to a non-acknowledgement (NACK) signal for the first packet via the second sub event from the first external electronic device, the first packet to the first external electronic device via a sub event immediately after the second sub event among the remaining sub events in the first CIS event.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry for Bluetooth low energy (BLE);
at least one processor comprising processing circuitry; and
memory comprising one or more storage media storing instructions, when executed by the at least one processor, to cause the electronic device to:
obtain a connected isochronous group (CIG) event including a first connected isochronous stream (CIS) event that includes first sub-events and a second CIS event that includes second sub-events that at least partially overlap at least part of the first sub-events, and
transmit, based on receiving an acknowledgement (ACK) signal for first data transmitted to a first external electronic device via a first sub-event among the first sub-events, second data to a second external electronic device via a third sub-event among the second sub-events,
wherein the third sub-event overlaps a second sub-event immediately after the first sub-event among the first sub-events.

2. The electronic device of claim 1, wherein the instructions, when executed by the at least one processor, cause the electronic device to obtain the CIG event based on identifying that an anchor point of each of the first sub-events is synchronized with an anchor point of each of the second sub-events.

3. The electronic device of claim 2, wherein the instructions, when executed by the at least one processor, cause the electronic device to obtain, based on identifying that the anchor point of each of the first sub-events is not synchronized with the anchor point of each of the second sub-events, the CIG event including the first CIS event and the second CIS event in sequential arrangement or the CIG event including the first CIS event and the second CIS event in interleaved arrangement.

4. The electronic device of claim 1, wherein the instructions, when executed by the at least one processor, cause the electronic device to obtain the CIG event by configuring an anchor point of the second CIS event within the first CIS event initiated from an anchor point of the first CIS event.

5. The electronic device of claim 1, wherein the instructions, when executed by the at least one processor, cause the electronic device to transmit, based on receiving from the first external electronic device via the first sub-event, the ACK signal for the first data that is a last target data transmitted to the first external electronic device via the first CIS event, the second data to the second external electronic device via the third sub-event among the second sub-events.

6. The electronic device of claim 1, wherein the third sub-event that overlaps the second sub-event is a sub-event initiating the second CIS event.

7. The electronic device of claim 6, wherein at least a portion of the second sub-events does not overlap any of the first sub-events.

8. The electronic device of claim 1, wherein the instructions, when executed by the at least one processor, cause the electronic device to obtain the CIG event based on receiving capability information of the first external electronic device from the first external electronic device and receiving capability information of the second external electronic device from the second external electronic device.

9. The electronic device of claim 1, wherein the instructions, when executed by the at least one processor, cause the electronic device to obtain the CIG event based on identifying that the first data or the second data is associated with a multimedia content.

10. The electronic device of claim 1, wherein the instructions, when executed by the at least one processor, cause the electronic device to obtain the CIG event based on identifying that quality of a link between the first external electronic device and the electronic device is above reference quality.

11. The electronic device of claim 1,
wherein the first CIS event is allocated for the first external electronic device,
wherein the second CIS event is allocated for the second external electronic device,
wherein an anchor point of the first CIS event among the anchor point of the first CIS event and an anchor point of the second CIS event is an anchor point of the CIG event,
wherein the instructions, when executed by the at least one processor, cause the electronic device to obtain another CIG event next to the CIG event,
wherein the other CIG event includes a third CIS event and a fourth CIS event,
wherein the third CIS event includes third sub-events and is allocated for the first external electronic device,
wherein the fourth CIS event includes fourth sub-events at least partially overlapped with at least part of the third sub-events and is allocated for the second external electronic device, and
wherein an anchor point of the fourth CIS event among an anchor point of the third CIS event and the anchor point of the fourth CIS event is an anchor point of the other CIG event.

12. The electronic device of claim 1, wherein the instructions, when executed by the at least one processor, cause the electronic device to cease, based on receiving the ACK signal via the first sub-event, to transmit data to the first external electronic device via all of remaining sub-events in the first CIS event.

13. The electronic device of claim 1,
wherein the first sub-event is a sub-event not overlapped with the second sub-events, and
wherein priority of a first service provided through the first data is higher than priority of a second service provided through the second data.

14. A method for operating an electronic device with a communication circuitry for Bluetooth low energy (BLE), the method comprising:
obtaining a connected isochronous group (CIG) event including a first connected isochronous stream (CIS) event that includes first sub-events and a second CIS event that includes second sub-events that at least partially overlap at least part of the first sub-events; and
transmitting, based on receiving an acknowledgement (ACK) signal for first data transmitted to a first external electronic device via a first sub-event among the first sub-events, second data to a second external electronic device via a third sub-event among the second sub-events,
wherein the third sub-event overlaps a second sub-event immediately after the first sub-event among the first sub-events.

15. The method of claim 14, wherein the obtaining of the CIG event comprises obtaining the CIG event based on identifying that an anchor point of each of the first sub-events is synchronized with an anchor point of each of the second sub-events.

16. The method of claim 15, further comprising:
obtaining, based on identifying that the anchor point of each of the first sub-events is not synchronized with the anchor point of each of the second sub-events, the CIG event including the first CIS event and the second CIS event in sequential arrangement or the CIG event including the first CIS event and the second CIS event in interleaved arrangement.

17. The method of claim 14, wherein the obtaining of the CIG event comprises obtaining, by configuring an anchor point of the second CIS event within the first CIS event initiated from an anchor point of the first CIS event, the CIG event.

18. The method of claim 14, wherein the transmitting of the second data comprises transmitting, based on receiving from the first external electronic device via the first sub-event, the ACK signal for the first data that is a last target data transmitted to the first external electronic device via the first CIS event, the second data to the second external electronic device via the third sub-event among the second sub-events.

19. The method of claim 14, wherein the third sub-event that overlaps the second sub-event is a sub-event initiating the second CIS event.

20. An electronic device comprising:
communication circuitry for Bluetooth low energy (BLE);
at least one processor comprising processing circuitry; and
memory comprising one or more storage media storing instructions, when executed by the at least one processor, to cause the electronic device to:
transmit, to a first external electronic device, a first packet that is a last packet from at least one target packet allocated for transmitting to a first external electronic device within a first connected isochronous stream (CIS) event in a connected isochronous group (CIG) event, via a first sub-event included in the first CIS event;
in response to receiving, via the first sub-event, from the first external electronic device, an acknowledgement (ACK) signal for the first packet transmit, via a second sub-event included in a second CIS event in the CIG event, to a second external electronic device, a second packet, the second sub-event overlapping a third sub-event, included in the first CIS event, subsequent to the first sub-event; and
in response to receiving, via the first sub-event, from the first external electronic device, a non-acknowledgement (NACK) signal for the first packet, re-transmit, via the third sub-event, to the first external electronic device, the first packet.

* * * * *